（12）United States Patent
Lee et al.

(10) Patent No.: US 7,244,627 B2
(45) Date of Patent: Jul. 17, 2007

(54) METHOD FOR FABRICATING LIQUID CRYSTAL DISPLAY DEVICE

(75) Inventors: Yun Bok Lee, Seoul (KR); Yong Sung Ham, Anyang-shi (KR); Su Hyun Park, Anyang-shi (KR); Seung Hee Nam, Suwon-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 64 days.

(21) Appl. No.: 10/920,207

(22) Filed: Aug. 18, 2004

(65) Prior Publication Data
US 2005/0046771 A1 Mar. 3, 2005

(30) Foreign Application Priority Data
Aug. 25, 2003 (KR) ............ 10-2003-0058803
May 31, 2004 (KR) ............ 10-2004-0039323

(51) Int. Cl.
*H01L 21/00* (2006.01)
(52) U.S. Cl. ............................. 438/30; 438/29
(58) Field of Classification Search ............. 438/30,
438/69, 71, 150, 155; 349/117, 123, 126,
349/129, 130, 132, 135; 257/117, 123, 126,
257/129, 130, 132, 135
See application file for complete search history.

(56) References Cited

U.S. PATENT DOCUMENTS

| 4,963,448 A | 10/1990 | Ichimura et al. |
| 4,974,941 A | 12/1990 | Gibbons et al. |
| 5,032,009 A | 7/1991 | Gibbons et al. |
| 5,200,238 A | 4/1993 | McArdle et al. |
| 5,237,440 A | 8/1993 | Watanabe et al. |
| 5,296,321 A | 3/1994 | Kawanishi et al. |
| 5,389,698 A | 2/1995 | Chigrinov et al. |
| 5,437,813 A | 8/1995 | Akashi et al. |
| 5,447,662 A | 9/1995 | Herr et al. |
| 5,464,669 A | 11/1995 | Kang et al. |
| 5,538,823 A | 7/1996 | Park et al. |
| 5,539,074 A | 7/1996 | Herr et al. |
| 5,576,862 A | 11/1996 | Sugiyama et al. |
| 5,578,351 A | 11/1996 | Shashidhar et al. |

(Continued)

FOREIGN PATENT DOCUMENTS

EP 0 559 173 8/1993

(Continued)

OTHER PUBLICATIONS

Search Report under Section 17 dated Nov. 29, 2004.

(Continued)

*Primary Examiner*—Kevin M. Picardat
(74) *Attorney, Agent, or Firm*—McKenna Long Aldridge LLP

(57) ABSTRACT

A method for fabricating a liquid crystal display (LCD) device to improve picture quality by preventing defective rubbing, is disclosed. The method which includes preparing first and second substrates, forming a thin film transistor on the first substrate, forming a first orientation layer on the first substrate including the thin film transistor, performing rubbing and orientation direction alignment processes on the first orientation layer to provide a uniform alignment direction, and forming a liquid crystal layer between the first and second substrates.

42 Claims, 24 Drawing Sheets

U.S. PATENT DOCUMENTS

| | | | |
|---|---|---|---|
| 5,602,661 A | 2/1997 | Schadt et al. | |
| 5,604,615 A | 2/1997 | Iwagoe et al. | |
| 5,623,354 A | 4/1997 | Lien et al. | |
| 5,624,974 A | 4/1997 | Onishi et al. | |
| 5,626,995 A | 5/1997 | Teruya et al. | |
| 5,648,829 A | 7/1997 | Yano | |
| 5,657,105 A | 8/1997 | McCartney | |
| 5,712,696 A | 1/1998 | Toko et al. | |
| 5,756,649 A | 5/1998 | Mizushima et al. | |
| 5,764,326 A | 6/1998 | Hasegawa et al. | |
| 5,767,994 A | 6/1998 | Kang et al. | |
| 5,781,259 A | 7/1998 | Shinomiya et al. | |
| 5,784,139 A | 7/1998 | Chigrinov et al. | |
| 5,786,041 A | 7/1998 | Takenaka et al. | |
| 5,991,001 A | 11/1999 | Park | |
| 6,055,103 A * | 4/2000 | Woodgate et al. | 349/129 |
| 6,476,898 B2 * | 11/2002 | Song et al. | 349/139 |
| 2001/0050744 A1 * | 12/2001 | Song et al. | 349/139 |
| 2002/0008830 A1 | 1/2002 | Matsumoto et al. | |
| 2002/0012091 A1 | 1/2002 | Lee | |
| 2002/0036738 A1 | 3/2002 | Matsumoto | |
| 2002/0047976 A1 | 4/2002 | Lee et al. | |
| 2003/0067575 A1 * | 4/2003 | Acosta et al. | 349/123 |
| 2003/0112394 A1 | 6/2003 | Yoshida et al. | |
| 2005/0024562 A1 * | 2/2005 | Hoff et al. | 349/117 |

FOREIGN PATENT DOCUMENTS

| | | |
|---|---|---|
| EP | 0 559 172 A2 | 9/1993 |
| EP | 0611786 | 8/1994 |
| EP | 1 018 664 A1 | 7/2000 |
| GB | 2286893 | 8/1995 |
| JP | 51117896 | 10/1976 |
| JP | 59147324 | 8/1984 |
| JP | 63049788 | 3/1988 |
| JP | 63106624 | 5/1988 |
| JP | 1251344 | 10/1989 |
| JP | 1251345 | 10/1989 |
| JP | 2055330 | 2/1990 |
| JP | 2298917 | 12/1990 |
| JP | 3036527 | 2/1991 |
| JP | 4007520 | 1/1992 |
| JP | 4284421 | 10/1992 |
| JP | 4350822 | 12/1992 |
| JP | 5034699 | 2/1993 |
| JP | 5053513 | 3/1993 |
| JP | 5173137 | 7/1993 |
| JP | 5203951 | 8/1993 |
| JP | 6003665 | 1/1994 |
| JP | 6034978 | 2/1994 |
| JP | 6110060 | 4/1994 |
| JP | 6118406 | 4/1994 |
| JP | 6130396 | 5/1994 |
| JP | 6194645 | 7/1994 |
| JP | 6194655 | 7/1994 |
| JP | 6194665 | 7/1994 |
| JP | 6222366 | 8/1994 |
| JP | 6265903 | 9/1994 |
| JP | 6281937 | 10/1994 |
| JP | 6287453 | 10/1994 |
| JP | 6289358 | 10/1994 |
| JP | 6289374 | 10/1994 |
| JP | 6294959 | 10/1994 |
| JP | 6294961 | 10/1994 |
| JP | 6297960 | 10/1994 |
| JP | 6308497 | 11/1994 |
| JP | 6347793 | 12/1994 |
| JP | 7036043 | 2/1995 |
| JP | 7043720 | 2/1995 |
| JP | 7043726 | 2/1995 |
| JP | 7056145 | 3/1995 |
| JP | 7056173 | 3/1995 |
| JP | 7064086 | 3/1995 |
| JP | 7064087 | 3/1995 |
| JP | 7064094 | 3/1995 |
| JP | 7064097 | 3/1995 |
| JP | 7209648 | 8/1995 |
| JP | 7261178 | 10/1995 |
| JP | 7261185 | 10/1995 |
| JP | 7281187 | 10/1995 |
| JP | 7294932 | 11/1995 |
| JP | 7318942 | 11/1995 |
| JP | 7318954 | 12/1995 |
| JP | 8062609 | 3/1996 |
| JP | 8122792 | 4/1996 |
| JP | 8114805 | 5/1996 |
| JP | 8152636 | 6/1996 |
| JP | 8184836 | 7/1996 |
| JP | 8254702 | 9/1996 |
| JP | 7072484 | 11/1996 |
| JP | 8334790 | 12/1996 |
| JP | 9005747 | 12/1996 |
| JP | 9033903 | 2/1997 |
| JP | 8231647 | 4/1997 |
| JP | 9105941 | 4/1997 |
| JP | 9211468 | 8/1997 |
| JP | 09-230351 A | 9/1997 |
| JP | 09-244027 | 9/1997 |
| JP | 2002-333625 | 11/2002 |
| JP | 2004046195 | 6/2003 |
| JP | 2004053784 | 1/2004 |
| JP | 2004035722 | 2/2004 |
| JP | 2004037615 | 2/2004 |
| JP | 2004037875 | 2/2004 |
| JP | 2004053654 | 2/2004 |
| JP | 2004053914 | 2/2004 |
| JP | 2004054090 | 2/2004 |
| JP | 2004061911 | 2/2004 |
| JP | 2004062098 | 2/2004 |
| JP | 2004069870 | 3/2004 |
| JP | 2004075944 | 3/2004 |
| JP | 2004083810 | 3/2004 |
| JP | 2004083853 | 3/2004 |
| JP | 2004086047 | 3/2004 |
| JP | 2004086116 | 3/2004 |
| JP | 2004091593 | 3/2004 |
| JP | 2004094179 | 3/2004 |
| JP | 2004045784 | 5/2004 |

OTHER PUBLICATIONS

IBM Technical Disclosure Bulletin; "Novel Two-Domain Twisted Nematic Structures and their Fabrication Methods to Prevent Reverse Twist and Image Sticking"; vol. 40 No. 05 May 1997, pp. 133-135.

Communication from Taiwanese Patent Office dated Jul. 4, 2005.

* cited by examiner

METHOD FOR FABRICATING LIQUID CRYSTAL DISPLAY DEVICE

This application claims the benefit of Korean Application Nos. P2003-58803 filed on Aug. 25, 2003, and P2004-39323 filed on May 31, 2004, which are hereby incorporated by reference for all purposes as if fully set forth herein.

BACKGROUND OF THE INVENTION

1. Field of the Invention

The present invention relates to a liquid crystal display (LCD) device. More particularly, the present invention relates to a method for fabricating a liquid crystal display (LCD) device to improve picture quality by preventing defective rubbing.

2. Discussion of the Related Art

Liquid crystal display (LCD) devices have attracted great attention as a substitute for a Cathode Ray Tube (CRT), because of the advantageous characteristics of the LCD such as thin profile, light weight, and low power consumption. The LCD device is driven by changing optical anisotropy in a method of applying an electric field to liquid crystal having fluidity and optical characteristics.

The LCD device has various modes based upon the properties and type of liquid crystal used within the device. Specifically, the LCD device may be may categorized as a Twisted Nematic (TN) mode that controls the liquid crystal director by applying a voltage after arrangement of the liquid crystal director twisted at 90°, a multi-domain mode that obtains a wide viewing angle by dividing one pixel into several domains, an Optically Compensated Birefringence (OCB) mode that compensates a phase change of light according to a progressing direction of light by forming a compensation film on an outer surface of a substrate, an In-Plane Switching (IPS) mode that forms an electric field parallel to two substrates by forming two electrodes on one substrate, and a Vertical Alignment (VA) mode that arranges a longitudinal (major) axis of liquid crystal molecule vertical to a plane of an orientation layer by using negative type liquid crystal and vertical orientation layer.

Generally, a LCD device includes an upper substrate of a color filter array, a lower substrate of a thin film transistor array, and a liquid crystal layer. The upper and lower substrates face each other, and a liquid crystal layer having dielectric anisotropy is formed between the two substrates. To use the LCD device as an optical device, it is necessary to align liquid crystal molecules of the liquid crystal layer at a predetermined direction. Accordingly, the orientation layer, organic polymer layer, is formed on the substrate, wherein the orientation layer has anisotropy by rubbing. The LCD device may be classified as a transmission type LCD device using a backlight as a light source, a reflective type LCD device using ambient light as a light source without forming the backlight, and a transflective type LCD device which overcomes the disadvantageous characteristics of the transmitting and reflective type LCD devices. The transmission type LCD device has the disadvantage of high power consumption due to the backlight, and the reflective type LCD device has the problem that it cannot be used in the dark surroundings.

The transflective type LCD device has both transmission and reflective parts in a unit pixel, whereby the transflective type LCD device serves as the transmitting or reflective type LCD device as needed. Accordingly, a pixel electrode may be formed as a transmitting electrode or a reflective electrode according to the kind of the LCD device. For example, the transmitting electrode may be formed in the transmission type LCD device and the transmitting part of the transflective type LCD device. Also, the reflective electrode may be formed in the reflective type LCD device and the reflective part of the transflective type LCD device. The transmitting electrode of the transmission type LCD device and the transflective type LCD device transmit light emitted from the backlight through a lower substrate to the liquid crystal layer, to obtain high luminance. Also, the reflective electrode of the reflective type LCD device and the transflective type LCD device reflects ambient light incident through an upper substrate, to obtain high luminance.

A related art IPS mode LCD device will now be described as follows. FIG. 1 is a plane view illustrating an IPS (In-Plane Switching) mode LCD device according to the related art. FIG. 2 illustrates voltage distributions of an EPS mode LCD device according to the related art. FIG. 3A and FIG. 3B are plane views illustrating an IPS mode LCD device when a voltage is turned on/off.

In the related art IPS mode LCD device, as shown in FIG. 1, gate and data lines 12 and 15 crossing each other are formed on a substrate to define a pixel region, and a common line 24a is formed within the pixel region substantially in parallel to the gate line 12. Also, a thin film transistor TFT is formed at a crossing portion of the gate and data lines 12 and 15, and a common electrode 24 diverged from the common line 24a is formed substantially in parallel to the data line 15 within the pixel region. A pixel electrode 17 is connected with a drain electrode of the thin film transistor TFT, and formed substantially in parallel between the common electrodes 24. Also, a storage electrode 25 extending from the pixel electrode 17 is formed on the gate line 12.

In the aforementioned IPS mode LCD device, if 5V is applied to the common electrode 24, and 0V is applied to the pixel electrode 17, as shown in FIG. 2, an equipotential surface is formed substantially parallel to the electrode at a portion corresponding to the electrode, and the equipotential surface is formed vertical to the electrode at a portion between the two electrodes. In this state, because a direction of an electric field is perpendicular to the equipotential surface, a substantially parallel electric field is generated between the common electrode 24 and the pixel electrode 17, a vertical electric field generates on the electrode, and the substantially parallel and vertical electric fields generate together at corners of the electrode.

In the IPS mode LCD device, it is possible to control the alignment of liquid crystal molecules by using the electric field. For example, as shown in FIG. 3A, if a voltage is applied to liquid crystal molecules 31 initially aligned in the same direction as a transmission axis of one polarizing sheet, longitudinal axes of the liquid crystal molecules 31 are aligned substantially parallel to the electric field, as shown in FIG. 3B. Specifically, first and second polarizing sheets are formed on outer surfaces of the lower and upper substrates, wherein transmission axes of the first and second polarizing sheets are arranged perpendicular to each other. As an orientation layer of the lower substrate is rubbed substantially parallel to the transmission axis of any one polarizing sheet, it is displayed as a normally black mode. That is, if the voltage is not applied to the device, the liquid crystal molecules 31 are aligned as shown in FIG. 3A, thereby displaying the black state. If the voltage is applied to the device, as shown in FIG. 3B, the liquid crystal molecules 31 are aligned substantially parallel to the electric field, thereby displaying the white state. In FIG. 3A and FIG. 3B, non-explained reference numbers '24' and '17' respectively represent the common electrode and the pixel electrode. Accordingly, the IPS mode LCD device has a wide viewing angle as compared with that of the TN mode LCD device.

A method for fabricating the aforementioned LCD device will be described in detail. The TN mode LCD device, the transflective mode LCD device and the IPS mode LCD device have similar fabrication processes. A method for fabricating the IPS mode LCD device will be described as follows. FIG. 4A to FIG. 4D are cross-sectional views illustrating the fabrication process of the IPS mode LCD device according to the related art.

As shown in FIG. 4A, a low-resistance metal layer is deposited on a lower substrate 11 by sputtering, and then patterned, thereby forming a gate line (not shown) and a gate electrode 12a. A common line (not shown) parallel to the gate line, and a plurality of common electrodes 24 diverged from the common line are formed at the same time. After that, a gate insulating layer 13 is formed in a method of depositing a silicon nitride layer $SiN_x$ on an entire surface of the lower substrate 11 including the gate line. Then, an amorphous silicon layer is deposited on the entire surface of the lower substrate 11, and then selectively removed, thereby forming a semiconductor layer 14 on the gate insulating layer 13 above the gate electrode 12a.

Referring to FIG. 4B, a low-resistance metal layer is deposited on the gate insulating layer 13 by sputtering, and then patterned to form a data line (not shown) and source/drain electrodes 15a and 15b. Subsequently, a plurality of pixel electrodes 17 are connected with the drain electrode 15b, and formed in parallel to the data line. The pixel electrodes 17 are arranged between each common electrode 24, whereby the pixel electrode 17 alternates with the common electrode 24. At this time, the pixel electrode 17 may be formed at the same time as the data line of metal, or may be formed additionally by using a transparent conductive layer such as ITO. Also, the pixel electrode 17 and the common electrode 24 may be formed in a straight pattern or a zigzag pattern. Thereafter, as shown in FIG. 4C, a passivation layer 16 is formed in a method of depositing or coating a silicon nitride layer or an organic insulating layer of BCB on the entire surface of the lower substrate 11 including the data line 15. Also, a first orientation layer 50 is formed on the passivation layer 16, and then rubbed.

As shown in FIG. 4D, a black matrix layer 22 of metal such as Cr or $CrO_x$ is formed on an upper substrate 21 to prevent light leakage, and R/G/B color filter layers 23 are formed between each black matrix layer 22 in an electrodeposition method, a pigment spray method or a coating method, to realize various colors. Then, a second orientation layer 60 is deposited thereon. Also, a sealant (not shown) is formed on the lower substrate 11 or the upper substrate 21, and spacers (not shown) are formed on any one of the two substrates 11 and 21. In this state, the two substrates 11 and 21 facing each other are bonded to each other. Then, liquid crystal 30 is injected between the lower and upper substrates 11 and 21 bonded to each other, and first and second polarizing sheets 81 and 82 are respectively formed on outer surfaces of the lower and upper substrates 11 and 21, thereby completing the IPS mode LCD device according to the related art. At this time, the transmission axes of the first and second polarizing sheets 81 and 82 are substantially perpendicular to each other, and one transmission axis is at the same direction as the electric field.

The rubbing process will be described in detail. FIG. 5 is a cross-sectional view explaining the rubbing process according to the related art. The rubbing process includes the sequential process of forming the organic high polymer layer referred to as the orientation layer on the substrate, and obtaining anisotropy therein. That is, polyamic acid or soluble polyimide is coated on the substrate, and sequentially cured at a temperature between 60° C. and 80° C. and between 80° C. and 200° C., whereby the coated polyamic acid or soluble polyimide is formed to a polyimide layer. As shown in FIG. 5, the polyimide layer is rubbed with a cylindrical rubbing roll 70. At this time, the rubbing process is progressed by rotating the cylindrical rubbing roll 70 coated with a rubbing cloth 71 such as nylon or rayon, so that the surface of the polyimide layer is rubbed mechanically. However, a perpendicular band or a horizontal band is generated by seams of the rubbing cloth 71 of the rubbing roll 70. Also, end portions of the rubbing cloth may come off the rubbing roll 70.

The aforementioned IPS mode LCD device according to the related art has the following disadvantages.

FIG. 6 is a photograph illustrating light leakage in a surface of step coverage in an LCD device according to the related art. FIG. 7 is a photograph illustrating light leakage in a surface having no step coverage in an LCD device according to the related art. Referring to FIG. 6, the thin film transistor array substrate in each mode has the step coverage on the surface thereof. That is, in case of the TN mode LCD device, the thin film transistor portion and the crossing portion of the gate and data lines are relatively higher than the other portions of the thin film transistor array substrate. In a case of the transflective type LCD device, the step coverage is generated between the transmitting part and the reflective part in the pixel region. Also, in the IPS mode LCD device, the step coverage of approx. 2500 Å is generated by the pattern of common electrode 24 and pixel electrode 17. During the rubbing process of the orientation layer 50, the rubbing cloth 71 is not in contact with the relatively low portion of the step coverage, thereby generating the defective rubbing. Also, in the IPS mode LCD device using three masks, step coverage of approx. 8000 Å is generated at the contact portion of the pixel electrode and the drain electrode of the thin film transistor. During the rubbing process of the orientation layer, the rubbing cloth is not in contact with the relatively low portion of the step coverage, thereby generating the defective rubbing. Referring to FIG. 6, the light leakage is generated in the initial black state because it is impossible to control the alignment of liquid crystal at the portion having no alignment pattern. The picture quality is deteriorated due to low contrast ratio. Meanwhile, the light leakage is generated in the surface having no step coverage due to the defective rubbing because the alignment pattern is not uniform due to non-uniformity of the rubbing cloth.

SUMMARY OF THE INVENTION

Accordingly, the present invention is directed to a method for fabricating a liquid crystal display (LCD) device that substantially obviates one or more problems due to limitations and disadvantages of the related art.

An advantage of the present invention is to provide a method for fabricating a liquid crystal display (LCD) device to prevent light leakage generated by defective rubbing, and to improve contrast ratio by progressing the alignment process with the rubbing process and ion beam irradiation/light irradiation/plasma irradiation.

Additional advantages and features of the invention will be set forth in the description which follows, and in part will become apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a method for fabricating an LCD device includes preparing first and second substrates; forming a thin film transistor on the first substrate; forming a first orientation layer on the first substrate including the thin film transistor; performing rubbing and orientation direction alignment processes on the first orientation layer to provide a uniform alignment direction; and forming a liquid crystal layer between the first and second substrates.

In another embodiment, a method for fabricating an LCD device includes preparing first and second substrates; forming a thin film transistor on the first substrate; forming a first orientation layer on the first substrate; performing rubbing and orientation direction alignment processes on the first orientation layer to provide a uniform alignment direction; forming a second orientation layer on the second substrate; performing a rubbing process on the second orientation layer; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
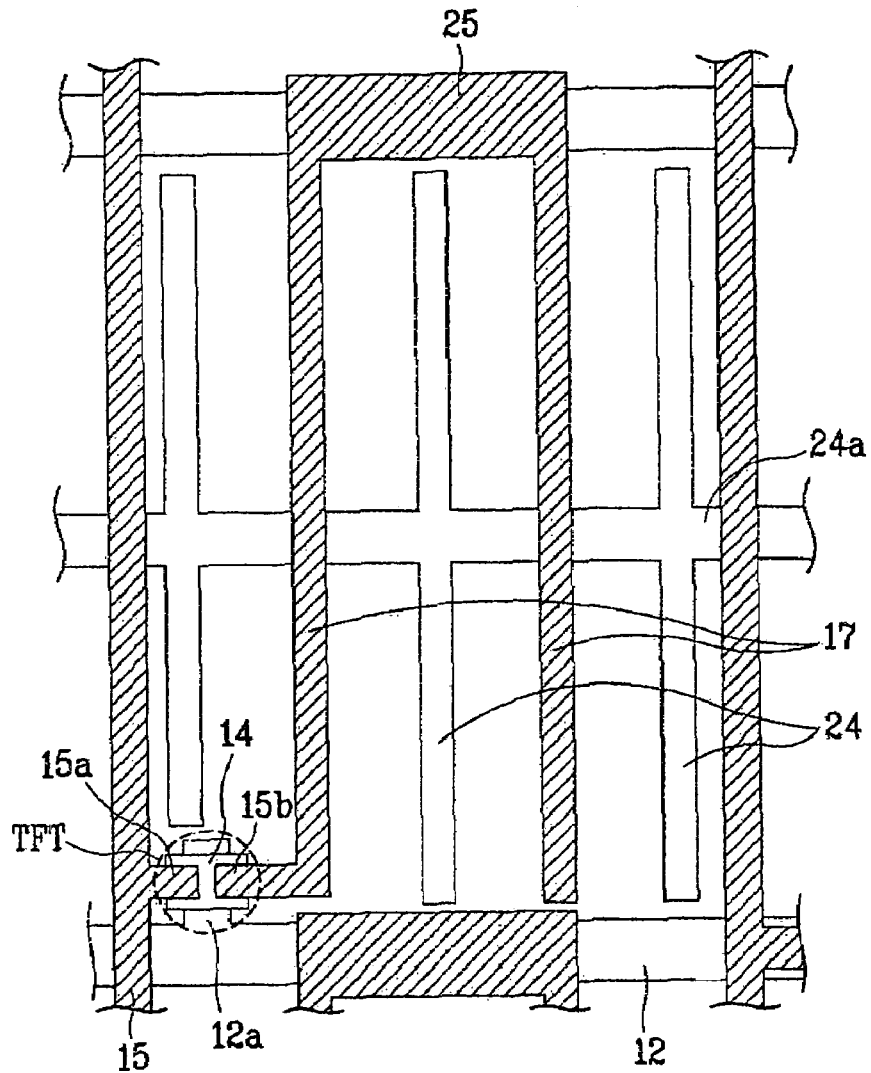
FIG. 1 is a plan view illustrating an (In-Plane Switching) IPS mode LCD device according to the related art.
Figure 2:
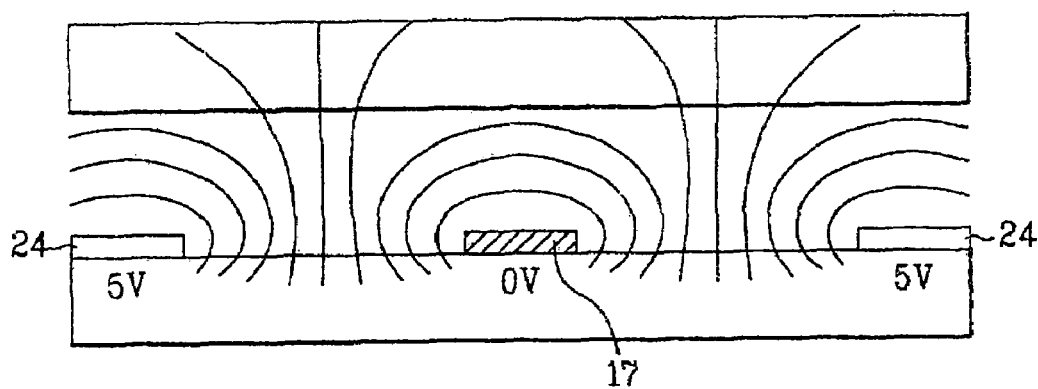
FIG. 2 illustrates voltage distributions of an IPS mode LCD device according to the related art.
Figure 3A:
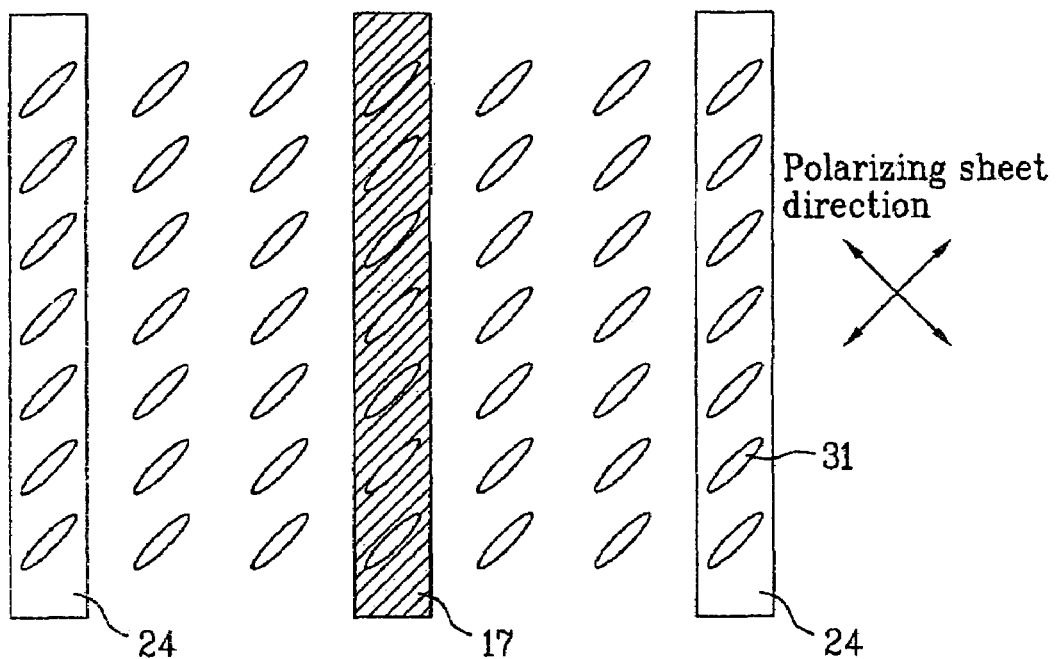
FIG. 3A and FIG. 3B are plan views illustrating an IPS mode LCD device when a voltage is turned on/off.
Figure 3B:
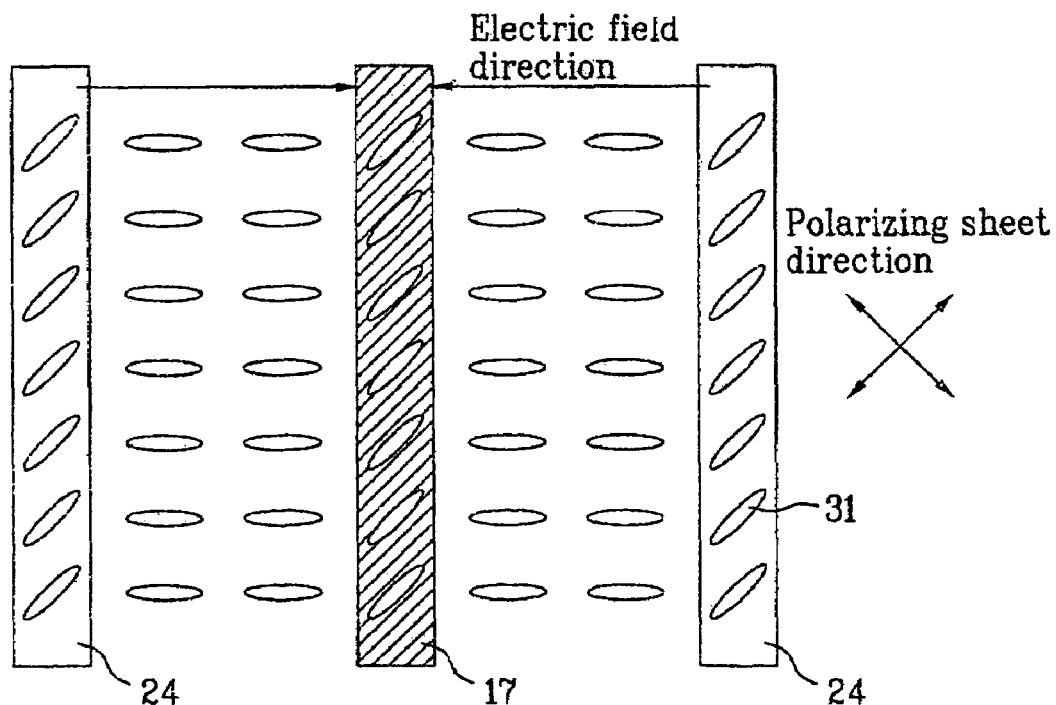
Figure 4A:
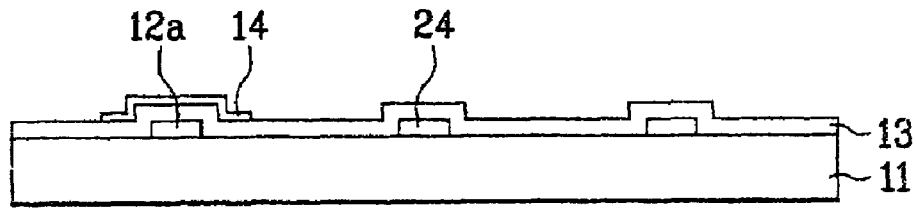
FIG. 4A and FIG. 4D are cross-sectional views illustrating the fabrication process of an IPS mode LCD device according to the related art.
Figure 4B:
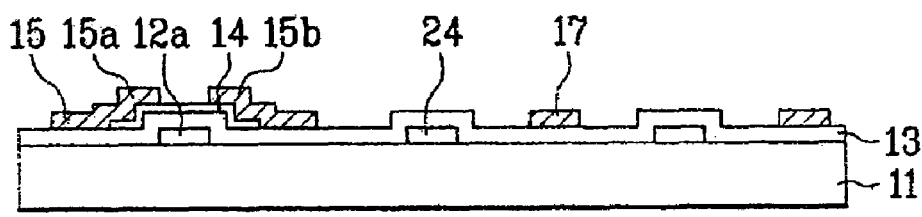
Figure 4C:
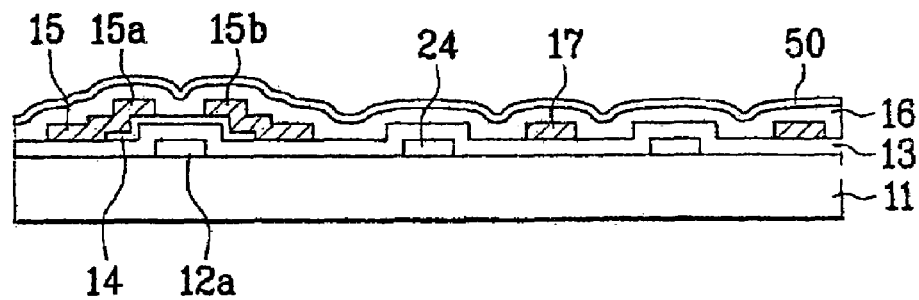
Figure 4D:
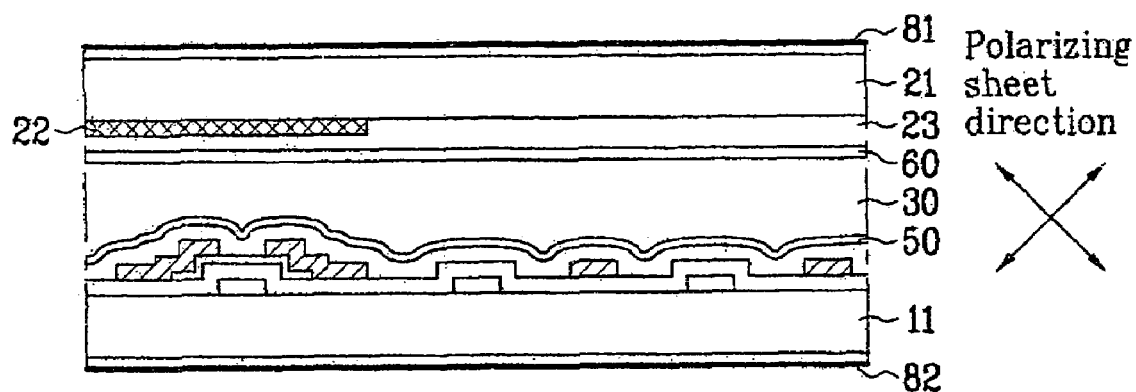
Figure 5:
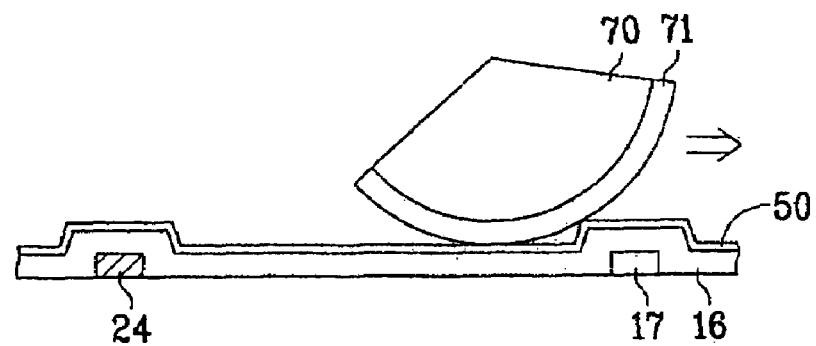
FIG. 5 is a cross-sectional view explaining the rubbing process according to the related art.
Figure 6:
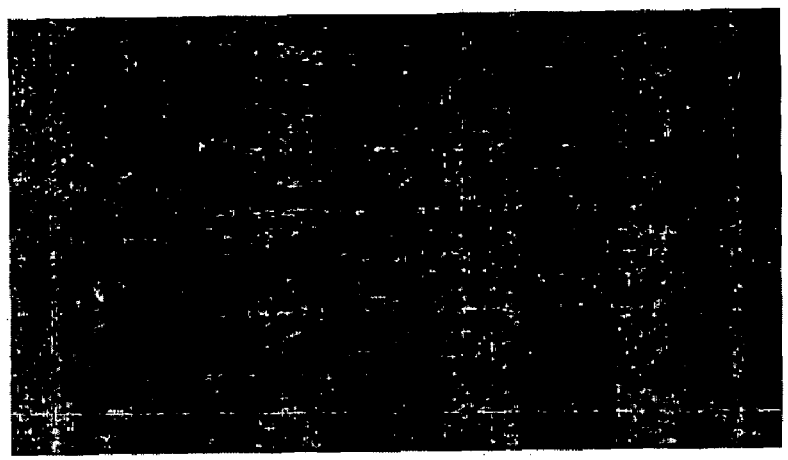
FIG. 6 is a photograph illustrating light leakage in a surface having step coverage in an LCD device according to the related art.
Figure 7:
FIG. 7 is a photograph illustrating light leakage in a surface having no step portion in an LCD device according to the related art.
Figure 8:
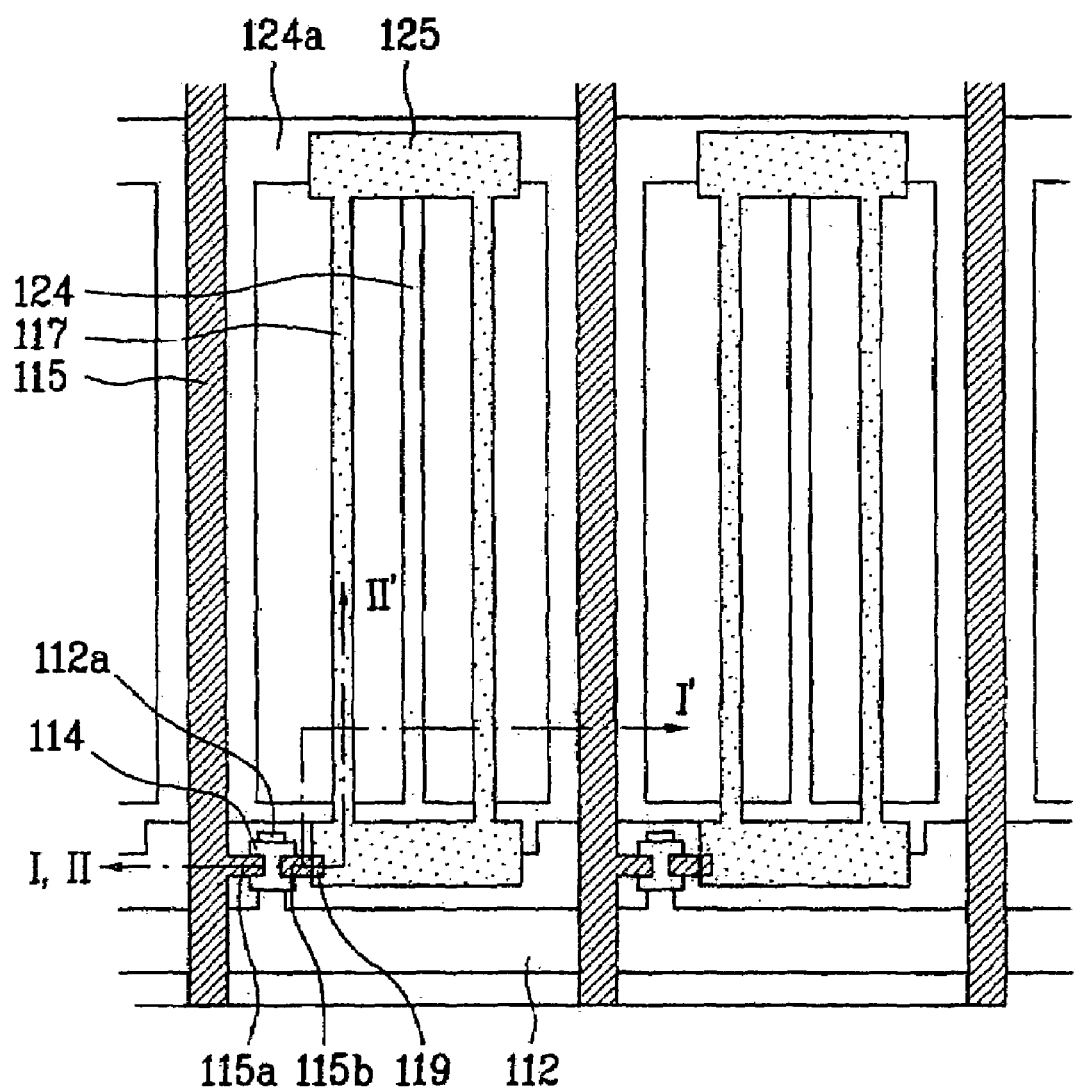
FIG. 8 is a plan view illustrating an IPS mode LCD device according to the first embodiment of the present invention.
Figure 10:
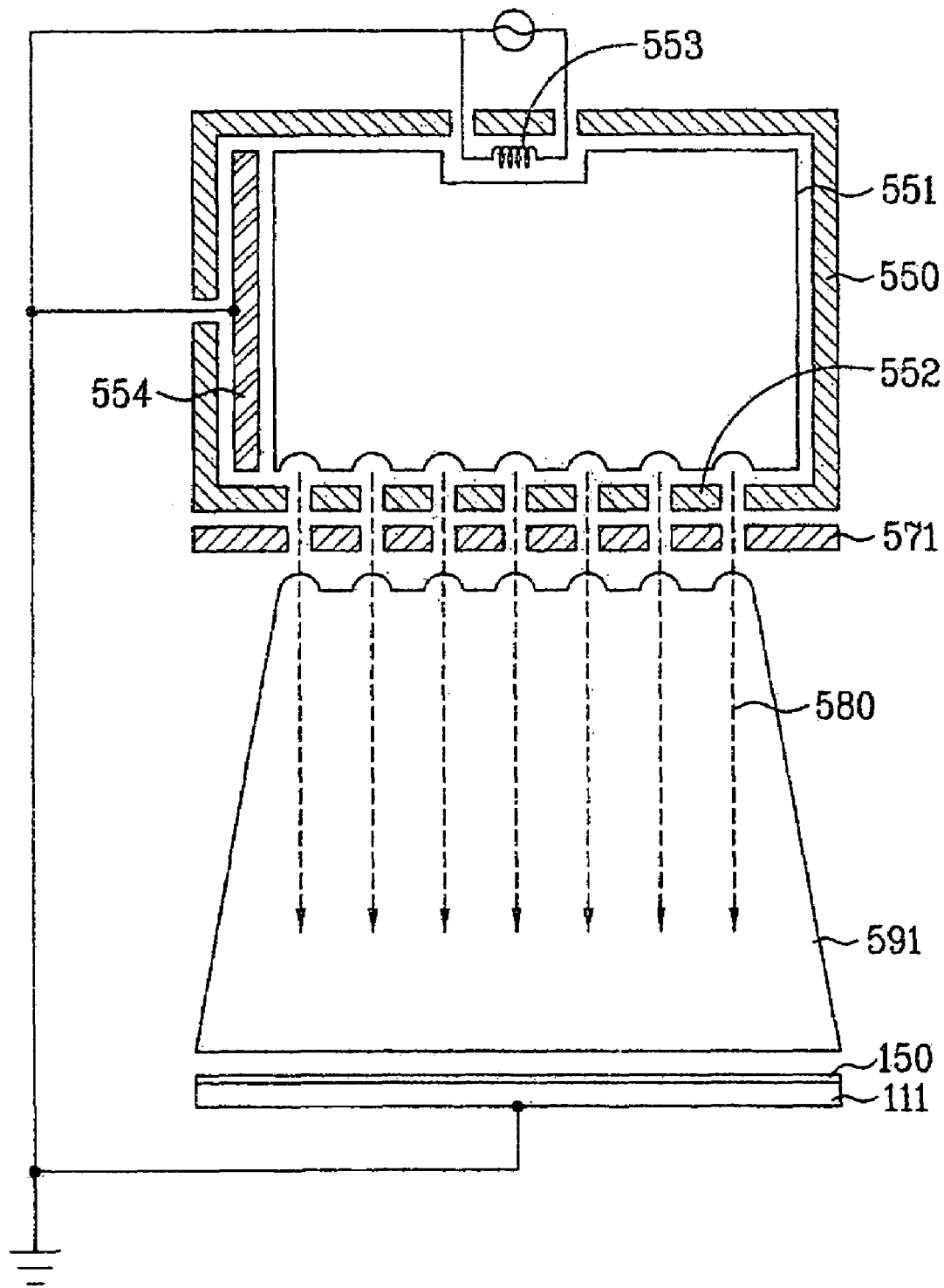
FIG. 10 is a cross-sectional view illustrating an ion beam irradiation device according to the present invention.
Figure 11:
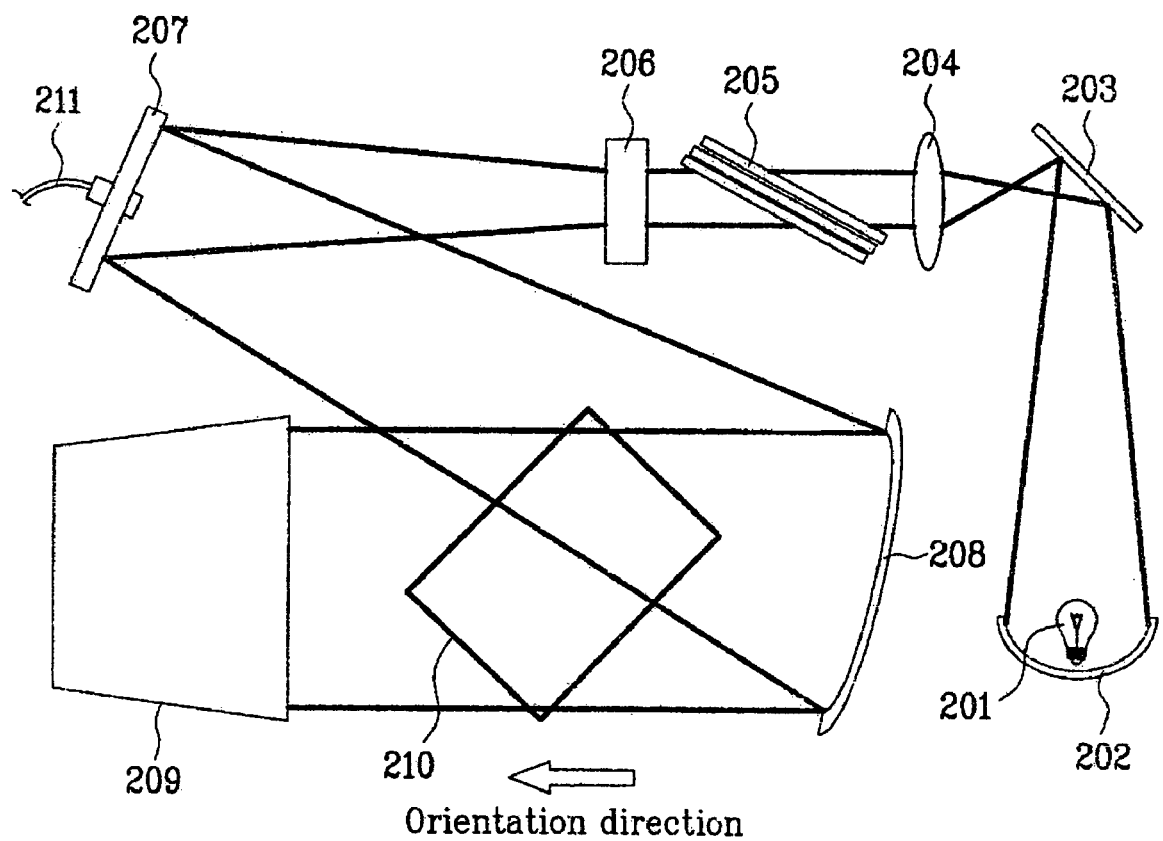
FIG. 11 is a schematic view illustrating a light irradiation device according to the present invention.

FIG. 8 is a plan view illustrating an IPS mode LCD device according to the first embodiment of the present invention. FIG. 9A to FIG. 9E are cross-sectional views illustrating the fabrication process of an IPS mode LCD device, taken along line I–I' of FIG. 8. FIG. 10 is a cross-sectional view illustrating an ion beam irradiation device according to the present invention. FIG. 11 is a schematic view illustrating a light irradiation device according to the present invention.

As shown in FIG. 8, the LCD device according to the first embodiment of the present invention includes a gate line 112, a data line 115, a common line 124a, a thin film transistor TFT, a common electrode 124, a pixel electrode 117, and a storage electrode 125. The gate and data lines 112 and 115 are formed on a substrate substantially perpendicular to each other to define a pixel region. The common line 124a is substantially parallel to the gate line 112 within the pixel region, and the thin film transistor TFT is formed at a crossing portion of the gate and data lines 112 and 115, the thin film transistor TFT including a gate electrode 112a, a semiconductor layer 114 and source/drain electrodes 115a/115b. Also, the common electrode 124 diverged from the common line 124a is substantially parallel to the data line 115 in the pixel region. Then, the pixel electrode 117 is connected with the drain electrode 115b of the thin film transistor TFT, and formed between and substantially parallel to each common electrode 124. The storage electrode 125 extending from the pixel electrode 117 is formed above the common line 124a.

A method for fabricating the IPS mode LCD device according to the first embodiment of the present invention will be described as follows.

Figure 9A:
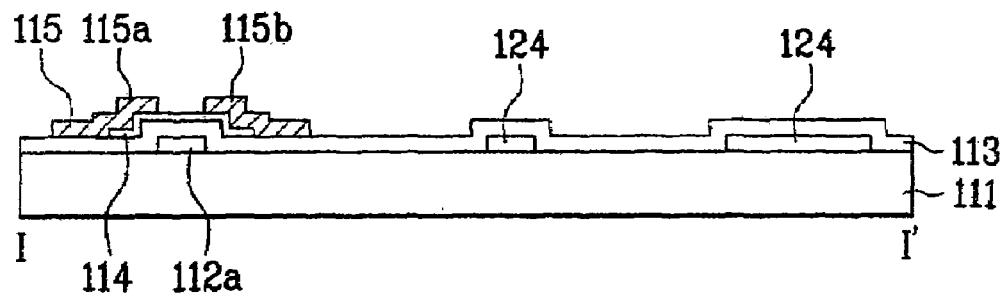
FIG. 9A to FIG. 9E are cross-sectional views illustrating the fabrication process of an IPS mode LCD device, taken along line I–I' of FIG. 8, according to the first embodiment of the present invention.

As shown in FIG. 9A, a low-resistance metal layer having low specific resistance is formed on a lower substrate 111 to prevent signal delay, and then patterned using photolithography, to form the gate line ('112' of FIG. 8) and the gate electrode 112a of the thin film transistor TFT, diverged from the gate line. The low-resistance metal layer maybe formed of copper (Cu), aluminum (Al), aluminum neodymium (AlNd), molybdenum (Mo), chrome (Cr), titanium (Ti), tantalum (Ta) or molybdenum-tungsten (MoW). When forming the gate line and the gate electrode 112a, the common line,('124a' of FIG. 8) is substantially parallel to the gate line and the plurality of common electrodes 124 diverged from the common line are formed at the same time. Subsequently, an inorganic insulating layer of silicon nitride ($SiN_x$) or silicon oxide ($SiO_x$) is formed on an entire surface of the lower substrate 111 including the gate electrode 112a by PECVD (Plasma Enhanced Chemical Vapor Deposition), thereby forming a gate insulating layer 113. Then, an amorphous silicon layer is formed on the gate insulating layer 113, and selectively removed to form an island-shaped (isolated) semiconductor layer 114 on the gate insulating layer 113 above the gate electrode 112a. Additionally, an ohmic contact layer may be patterned in a method of implanting impurity ions into the amorphous silicon layer.

Figure 9B:
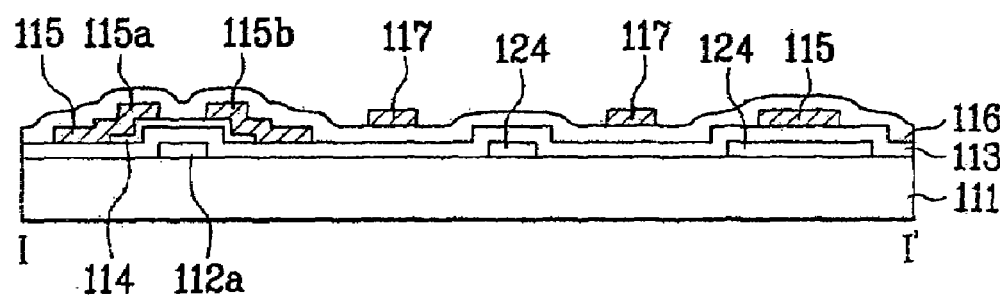

In FIG. 9B, a metal layer of Cr, Cu, Al, Mo, Ti, Ta, MoW or AlNd is formed on an entire surface of the gate insulating layer 113, and patterned using photolithography, thereby forming the data line 115 and the source/drain electrodes 115a/115b at the same time. The data line 115 is substantially perpendicular to the gate line to define the pixel region, and the source/drain electrodes 115a/115b are formed at both sides of the semiconductor layer 114. After that, a silicon nitride layer or an organic insulating layer of BCB is deposited or coated on the entire surface of the lower substrate 111 including the data line 115, to form a passivation layer 116, and a contact hole (not shown, 119 of FIG. 8) in the drain electrode 115b. Thereafter, a transparent conductive layer (ITO or IZO) is deposited on the entire surface of the lower substrate 111, and patterned to form the plurality of pixel electrodes 117, wherein each pixel electrode 117 is connected with the drain electrode 115b substantially in parallel with the data line 115, and formed between the common electrodes 124. Thus, the pixel electrode 117 formed in an alternating pattern with the common electrode 124. Although not shown, if the pixel electrode 117 is formed of a metal material, the pixel electrode 117 may be formed of the same material as the data line at the same time before forming the passivation layer.

Figure 9C:
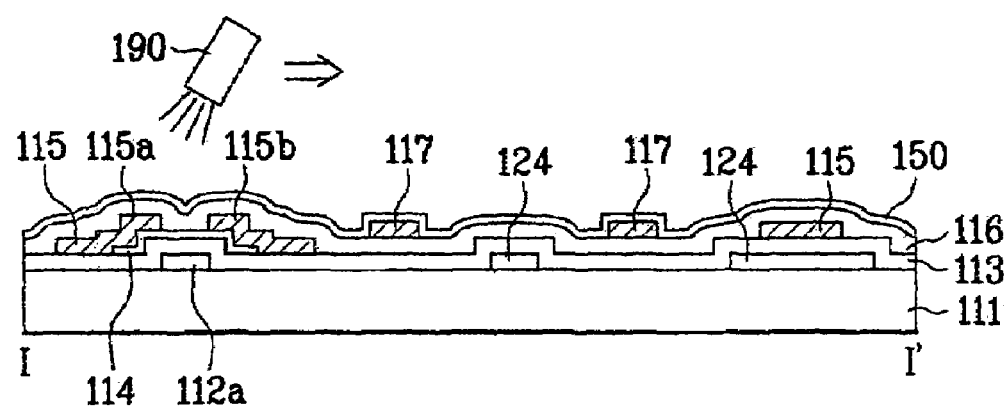
Figure 9D:
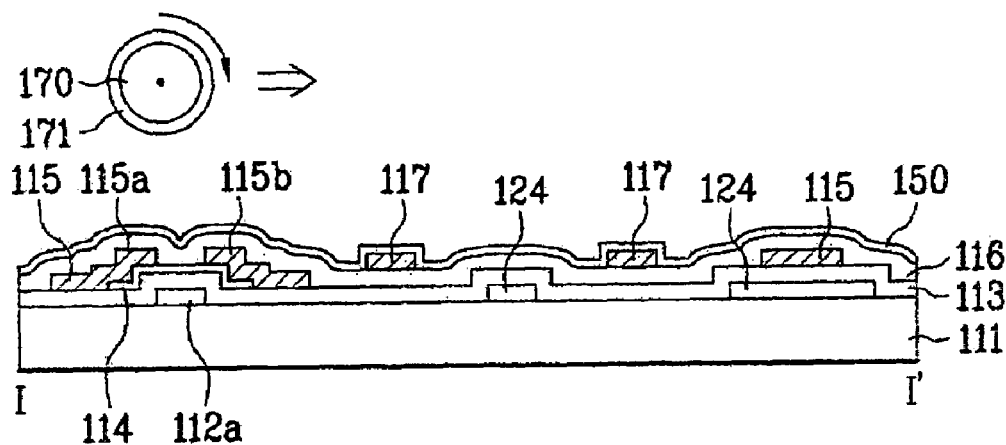

In FIG. 9C, polyimide resin having thermal-resistance and great affinity to liquid crystal is formed on the entire surface of the lower substrate 111 including the pixel electrode 117. Then, the printed polyimide resin is dried, thereby forming a first orientation layer 150. By using an ion beam irradiation device 190, an ion beam is irradiated on the first orientation layer 150. It is important to irradiate the ion beam at the same direction as a rubbing direction. After irradiating the ion beam on the first orientation layer 150, as shown in FIG. 9D, the first orientation layer 150 is rubbed with a cylindrical roll 170, on which a cloth 171 of rayon or nylon is adhered, whereby an orientation direction is formed at a first polarizing direction. By performing the rubbing process on the orientation layer, the physical and chemical characteristics of the first orientation layer 150 are changed, thereby forming the orientation direction. The orientation direction may be uniformly formed on the entire surface of the substrate by the orientation direction alignment process (ion beam irradiation, light irradiation or plasma irradiation). In this respect, there is no problem of defective rubbing even though the cloth is not in contact with the orientation layer due to step coverage of the substrate.

As shown in FIG. 10, the ion beam 580 is generated by electron collision of neutral gases in a plasma discharge region 551 of the ion beam irradiation device, and then is accelerated through an extraction region 571, thereafter, is transmitted to the substrate 111 through a beam plasma region 591. In detail, the ion beam 580 is generated by the electron collision of the neutral gas in the plasma discharge region 551. Then, the electron is discharged by a heated filament of the anode 553, and then is accelerated by a voltage differential between the anode 553 and the cathode 554. In this state, the discharged plasma exists inside a chamber 550 and plasma grid, and is discharged to the outside through the extraction region 571 and the beam plasma region 591. As a result, the plasma reaches the substrate 111 of a grounded target, on which the orientation layer 150 is deposited. The substrate 111 may be variably positioned based upon the irradiation direction of the ion beam 580 to control the orientation direction, so that it is possible to control a pretilt angle by controlling the irradiation angle and irradiation time of the ion beam and energy intensity of the irradiated beam. Generally, argon ion is used for the ion beam process. Instead of the ion beam irradiation, it is possible to perform light irradiation.

The orientation layer may be formed of polyimide, polyamic acid, polyvinylcinnamate, polyazobenzene, polyethyleneimine, polyvinyl alcohol, polyamide, polyethylene, polystylene, polyphenylenephthalamide, polyester, polyurethane, or polymethyl methacrylate. Also, it is possible to use partially polarized light, linearly polarized light or non-polarized light. Furthermore, the light may be irradiated at a wavelength between 200 nm and 450 nm, and at an energy between about 0.1 J and about 10 J. The light having energy between 0.1 J and 5 J is used to minimize the damage of the first orientation layer 150. Also, the light is obliquely irradiated with respect to the substrate or irradiated in the substantially perpendicular direction with respect to the substrate.

A light irradiation device will be briefly described. As shown in FIG. 11, the light irradiation device is provided with a lamp 201, a lamp housing 202, a first plane mirror 203, a convex lens 204, a polarizing system 205, a fly eye lens 206, a second plane mirror 207, a UV illuminometer 211, a curved mirror 208, and a third plane mirror 209. The lamp 201 emits UV rays in one direction, and the first plane mirror 203 reflects the UV rays emitted from the lamp 201. Then, the convex lens 204 concentrates the UV rays reflected from the first plane mirror 203, and the polarizing system 205 polarizes the light concentrated on the convex lens 204 partially or linearly, and the fly eye lens 206 diversifies the focus of the polarized rays. After that, the second plane mirror 207 reflects the rays transmitted from the fly eye lens 206, and the UV illuminometer 211 is provided in the second plane mirror 207 to detect the luminous intensity of the rays. Also, the curved mirror 208 and the third plane mirror 209 are provided to transmit the rays to the orientation layer. In this scenario, the polarizing system 205 may or may not be used. That is, in a case of the UV rays irradiation, it is possible to irradiate the non-polarized light.

If the partially polarized light is irradiated, the polarizing system 205 is formed in a method of forming quartz substrates, wherein the proper polarizing intensity may be obtained by controlling the number of the quartz substrates. Thus, on a large-sized substrate, it is possible to irradiate the light onto the substrate with simplicity. Also, if using the non-polarized light, it is not required to provide the polarizing system 205. Meanwhile, if using linearly polarized light, it is possible to use a linear polarizer. In a case of the light irradiation, it is preferable to use substantially parallel light. Also, in a case of irradiating the polarized light, it is important to polarize the light in a same direction as a direction of the orientation direction alignment process. At this time, a polarizing direction of the orientation direction alignment process may use the polarized light in a substantially perpendicular direction to the rubbing direction.

Figure 9E:
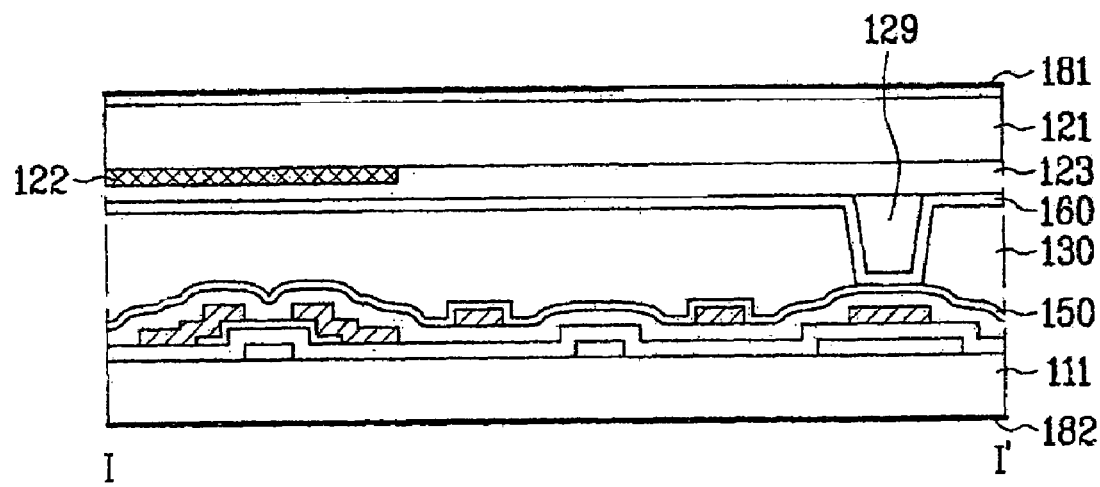

Subsequently, as shown in FIG. 9E, a black matrix layer 123 is formed on an upper substrate 121 to prevent light leakage on portions corresponding to the gate line, the data line and the thin film transistor, in which liquid crystal is not controlled. The black matrix layer 123 may be formed of a metal material having great flexibility, such as chrome Cr, chrome oxide $CrO_x$, or black resin. Next an R/G/B color filter layer 122 may be formed in an electrodeposition method, a pigment spraying method, or a coating method to realize various colors. Although not shown, an overcoat layer may be formed on an entire surface of the upper substrate 121 including the color filter layer 122 to protect the color filter layer 122.

Next, a polyimide material having great affinity to liquid crystal and photosensitive characteristics may be formed on the overcoat layer, thereby forming a second orientation layer 160. The second orientation layer 160 forms an orientation direction at a second polarizing direction substantially perpendicular to the orientation direction of the first orientation layer 150. Similar to the orientation process for the first orientation layer 150, the orientation process for the second orientation layer 160 is completed by performing a rubbing process and the orientation direction alignment process (ion beam irradiation, light irradiation or plasma irradiation) together. Subsequently, a column spacer 129 is formed on the upper substrate 121 or the lower substrate 111, and liquid crystal is dispensed on a display area of the upper substrate 121 or the lower substrate 111. Then, a sealant having no injection inlet is formed in a periphery of the upper substrate 121 or the lower substrate 111, and the upper and lower substrates 121 and 111 are bonded to each other in a vacuum state. Alternatively, the spacer may be scattered after forming the sealant having an injection inlet in the periphery of the upper substrate 121 or the lower substrate 111, and then the upper and lower substrates 121 and 111 are bonded to each other in the spacer formed therebetween. After that, the liquid crystal 130 is injected between the upper and lower substrates 121 and 111 in the vacuum state. Specifically, the liquid crystal layer may be formed using a liquid crystal injection method or liquid crystal dispensing method. Next, first and second polarizers 181 and 182 are formed on outer surfaces of the upper and lower substrates 121 and 111, thereby completing the IPS mode LCD device.

Transmission axes of polarizing axes in the first and second polarizers 181 and 182 are substantially perpendicular to each other, and any one of the transmission axes is formed at the same direction as an electric field direction. When a voltage is not applied to the above LCD device, the polarizing axis of the first or second polarizer formed on the upper or lower substrate is substantially perpendicular to a longitudinal (major) axis of the liquid crystal molecule, thereby displaying a normally black mode. Meanwhile, if a voltage is applied to the above LCD device, the longitudinal axis of liquid crystal molecule is twisted, thus, the light incident on the first polarizing axis formed on the lower substrate is transmitted to the second polarizing axis of the upper substrate to display a normally white mode. It is possible to change the normally black mode to the normally white mode by changing the direction of the polarizing axis and the type of liquid crystal. In the method for fabricating the LCD device of the first embodiment, it is more effective to perform the orientation direction alignment process (ion beam irradiation, light irradiation or plasma irradiation) after the rubbing process.

Figure 12A:
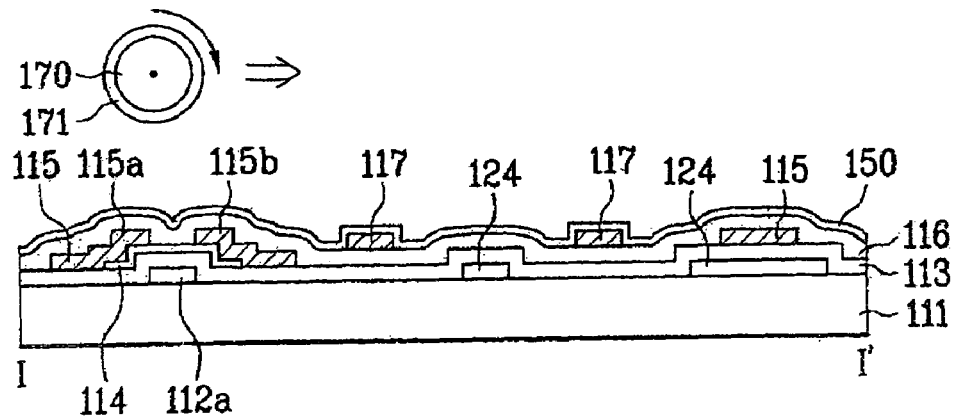
FIG. 12A to FIG. 12C are cross-sectional views illustrating the fabrication process of an LCD device according to the second embodiment of the present invention.
Figure 12B:
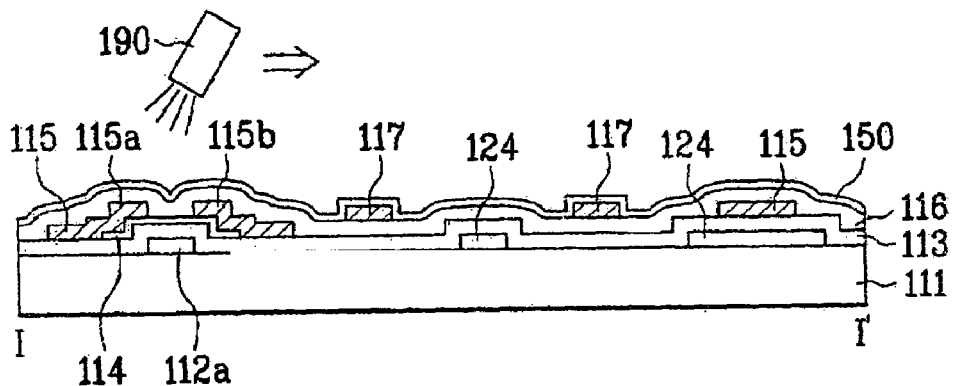
Figure 12C:
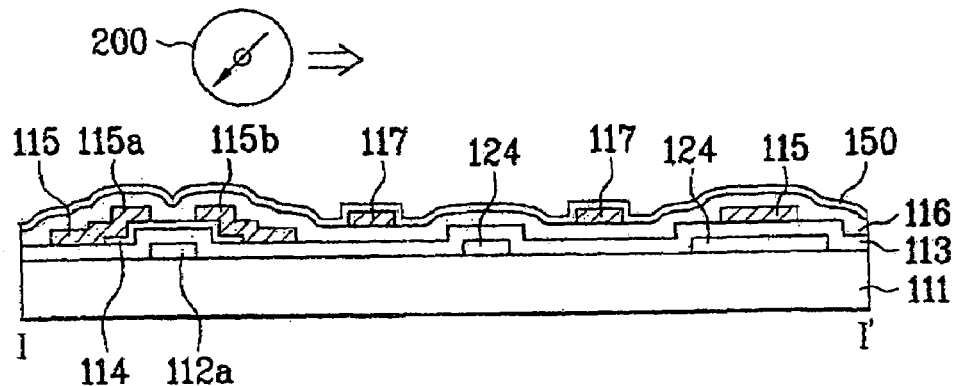

FIG. 12A to FIG. 12C are cross-sectional views illustrating the fabrication process of an LCD device according to a second embodiment of the present invention. In a method for fabricating the LCD device according to the second embodiment of the present invention, a gate electrode 112a, a common electrode 124, a data line, source/drain electrodes 115a/115b and a pixel electrode 117 are formed as shown in FIG. 9A and FIG. 9B.

As shown in FIG. 12A, polyimide resin having thermal-resistance and great affinity to liquid crystal is printed on an entire surface of a substrate, and dried to form a polyimide, thereby forming a first orientation layer 150. Then, the first orientation layer 150 is rubbed with a cylindrical roll 170 on which a nylon cloth 171 is adhered. An orientation direction is formed at a first polarizing direction. The cloth 171 may not be in contact with the orientation layer corresponding to a step portion of the substrate on the rubbing process, so that the orientation layer corresponding to the step portion may not be aligned.

Accordingly, as shown in FIG. 12B, by using an ion beam irradiation device 190, an ion beam is irradiated on the first orientation layer 150 rubbed with the cloth 171. The ion beam may be irradiated on an entire surface of the first orientation layer 150 or irradiated on the first orientation layer 150 after masking remaining portions of the first orientation layer 150 except the step coverage by the common electrode or the pixel electrode. Instead of the ion beam irradiation device, as shown in FIG. 12C, using a light irradiation device 200, light may be irradiated on the first orientation layer 150 rubbed with the cloth 171, thereby completing the orientation process. In this case, the light may be irradiated on an entire surface of the first orientation layer 150, or irradiated on the first orientation layer 150 after masking remaining portions of the first orientation layer 150 except the step portion by the common electrode or the pixel electrode. The ion beam irradiation or the light irradiation is completed under the same condition as that of the first embodiment of the present invention discussed above.

As shown in FIG. 9E, a second orientation layer 160 is formed on an upper substrate 121, wherein the second orientation layer 160 forms an orientation pattern as a second polarizing direction substantially perpendicular to the first polarizing direction of the first orientation layer 150. Like the first orientation layer 150, the orientation direction alignment process (ion beam irradiation, light irradiation or plasma irradiation) may be performed after the rubbing process, and then the two substrates are bonded to each other, and a liquid crystal layer is formed between the two substrates. In the case of an IPS mode LCD device forming the common electrode 124 and the pixel electrode 117 as a zigzag pattern applied to the first and second embodiments of the present invention, it is possible to perform the aforementioned rubbing process and orientation direction alignment process together.

Figure 13A:
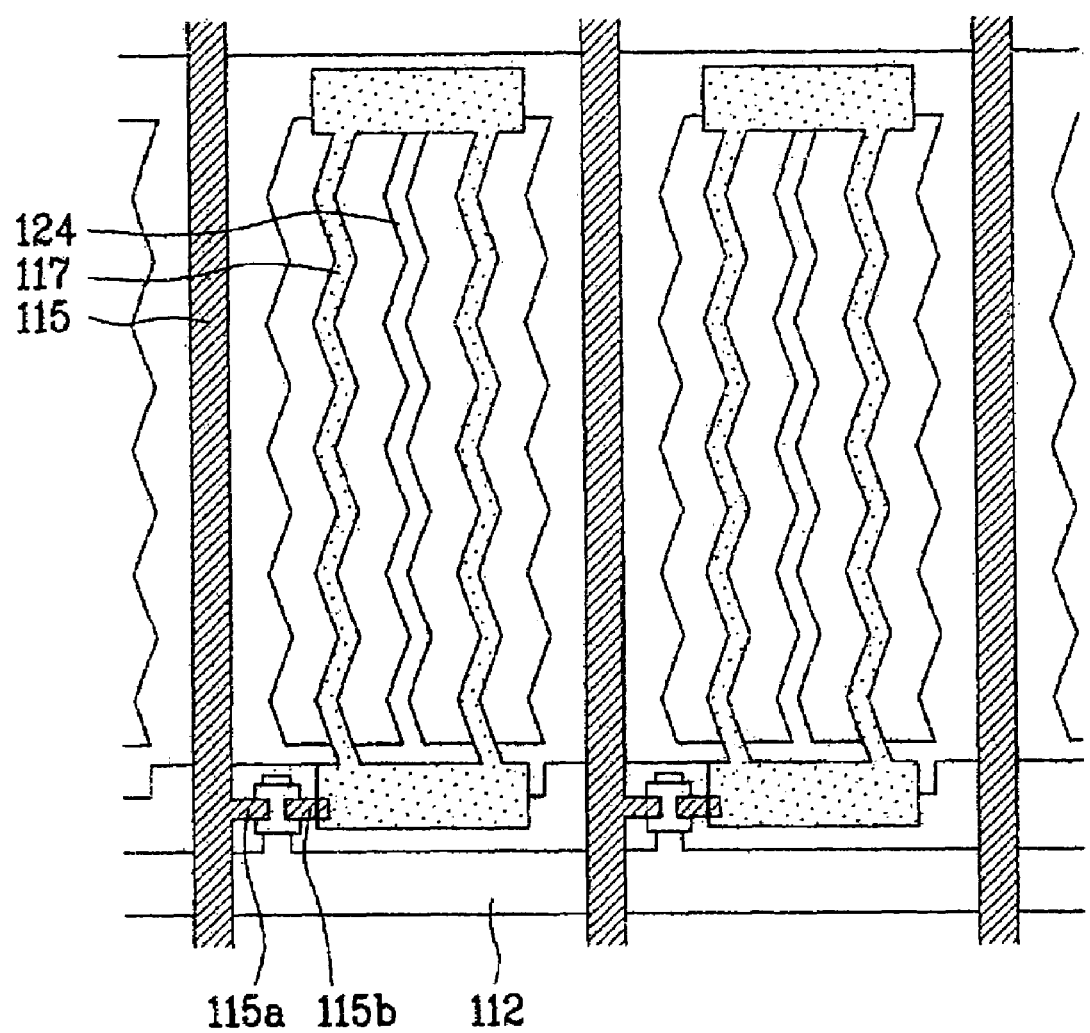
FIG. 13A is a plan view illustrating another type IPS mode LCD device in the first and second embodiments of the present invention.
Figure 13B:
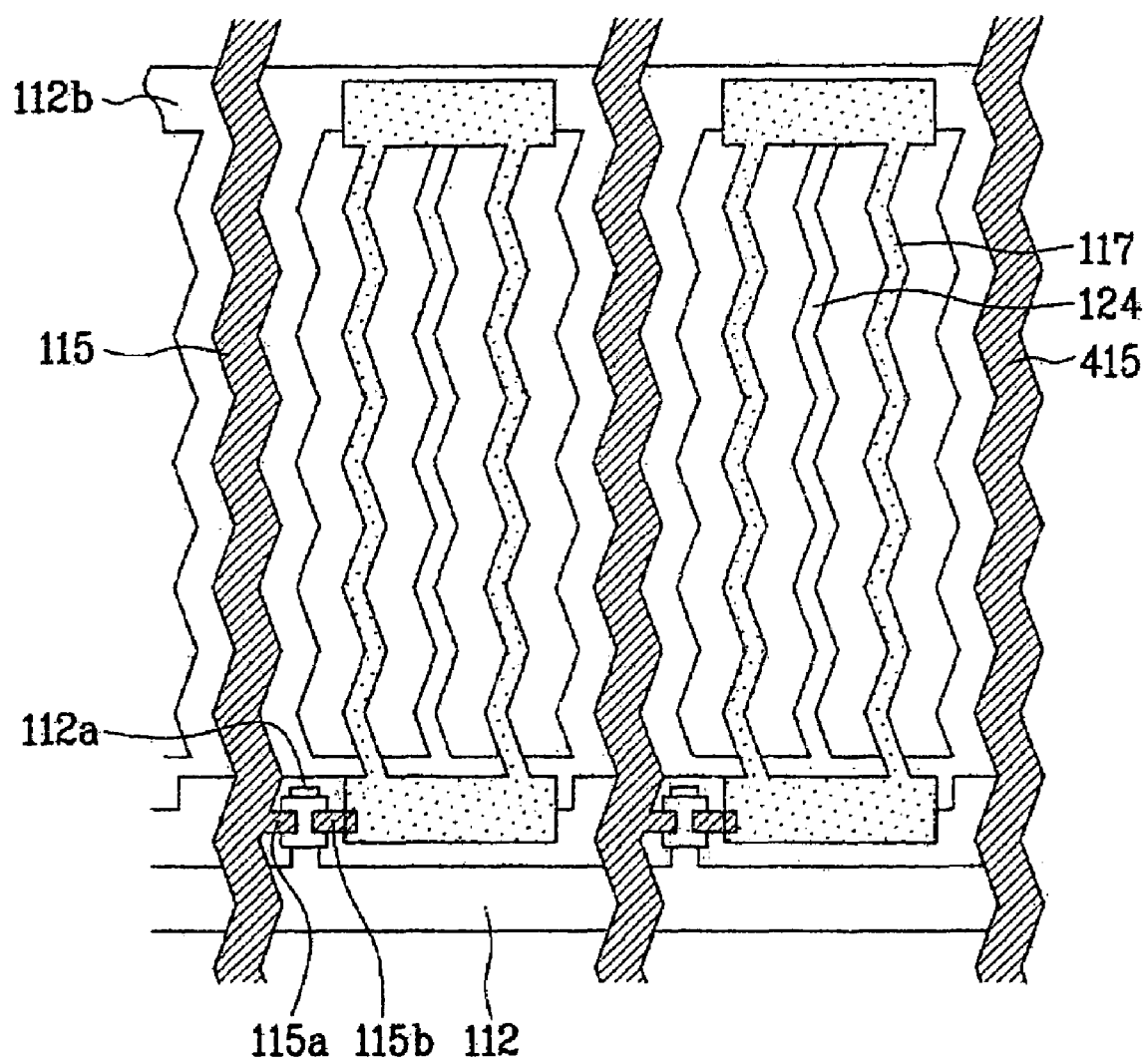
FIG. 13B is a plan view illustrating another type IPS mode LCD device in the first and second embodiment of the present invention.

FIG. 13A is a plan view illustrating an alternate type of IPS mode LCD device according to the first and second embodiments of the present invention. FIG. 13B is a plan view illustrating another type of IPS mode LCD device according to the first and second embodiment of the present invention. When the IPS mode LCD device includes the common electrode 124 and the pixel electrode 117 formed in the zigzag pattern, as shown in FIG. 13A and FIG. 13B, it is possible to perform the aforementioned rubbing process and orientation direction alignment process together.

In the IPS mode LCD device according to the first and second embodiments of the present invention, the common electrode 124 may be formed of the same material as the gate line on the same layer, and the pixel electrode may be formed of the same material as the source/drain electrodes on the same layer. It is also possible to perform the aforementioned rubbing process and orientation direction alignment process in an IPS mode LCD device in which the pixel electrode is formed of a transparent conductive layer (ITO or IZO), and the common electrode is formed of the same material as the pixel electrode (ITO or IZO) on the same layer to improve an aperture ratio.

Figure 14:
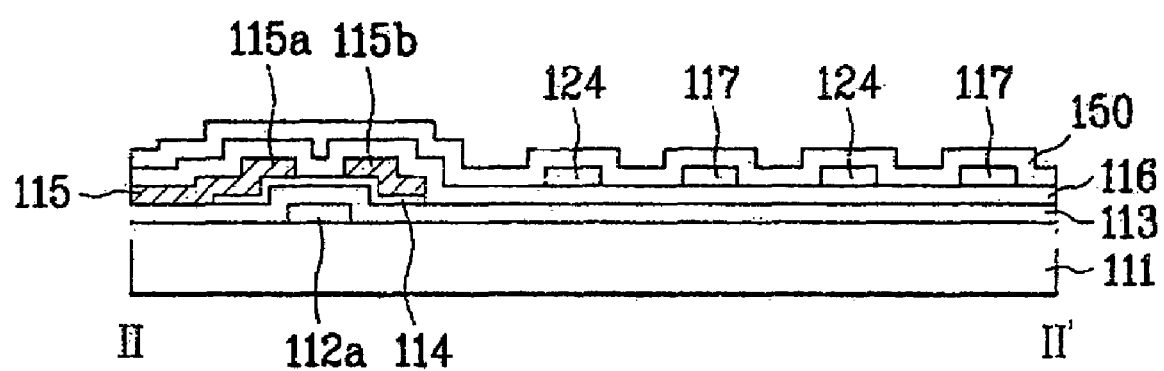
FIG. 14 is a cross-sectional view illustrating another type IPS mode LCD device according to the present invention.

FIG. 14 is a cross-sectional view illustrating an IPS mode LCD device, wherein a pixel electrode and a common electrode are formed of transparent conductive layers, according to the present invention. That is, a gate line (not shown) having a gate electrode 112a is formed on a substrate, and a gate insulating layer 113 is formed on an entire surface of the substrate including the gate electrode 112a. Then, a semiconductor layer 114 is formed on the gate insulating layer 113 above the gate electrode 112a. Also, a data line is formed substantially perpendicular to the gate line. Simultaneously, source and drain electrodes 115a and 115b are formed at both sides of layer 116 having a contact hole in the drain electrode 115 is formed on an entire surface of the substrate including the source and drain electrodes 115 and 115b. Then, a common electrode 124 and a pixel electrode 117 are formed of a transparent conductive layer in a pixel region on the passivation layer 116. At this time, the pixel electrode 117 and the common electrode 124 are formed substantially in parallel at a fixed interval. Also, a first orientation layer 150 is formed on the entire surface of the substrate. Like the first or second embodiment of the present invention, the rubbing process and the orientation direction alignment process may be performed together so that the orientation process is performed to the first orientation layer.

In a method for fabricating the IPS mode LCD device using three masks, the rubbing process and the orientation direction alignment process (using, for example, ion beam irradiation, light irradiation or plasma irradiation) are performed together because there is a step portion at a contact portion between the pixel electrode and the drain electrode of the thin film transistor, thereby preventing defective orientation. This embodiment will be described in detail with reference to FIG. 15A to FIG. 15I, which are cross-sectional views illustrating the fabrication process of an LCD device according to the third embodiment of the present invention using three masks along the line II–II' of FIG. 8.

Figure 15A:
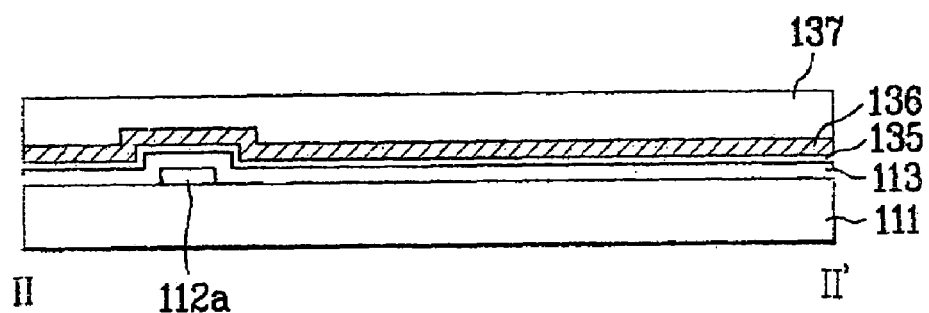
FIG. 15A to FIG. 15I are cross-sectional views illustrating the fabrication process of an LCD device according to the third embodiment of the present invention, which uses three masks on the line II–II' of FIG. 8.

As shown in FIG. 15A, a low-resistance metal layer having low specific resistance is formed on a lower substrate 111 to prevent signal delay. The metal layer is patterned using photolithography to form a gate line and a gate electrode 112a of a thin film transistor, the gate electrode 112a diverged from the gate line. The low-resistance metal layer may be formed of copper (Cu), aluminum (Al), aluminum neodymium (AlNd), molybdenum (Mo), chrome (Cr), titanium (Ti), tantalum (Ta) or molybdenum-tungsten (MoW). When forming the gate line and the gate electrode 112a, a common line and a plurality of common electrodes are formed at the same time. The common line is substantially parallel to the gate line, and the plurality of common electrodes are diverged from the common line. Subsequently, an inorganic insulating layer of silicon nitride ($SiN_x$) or silicon oxide ($SiO_x$) is formed on the entire surface of the lower substrate 111 including the gate electrode 112a by PECVD (Plasma Enhanced Chemical Vapor Deposition) to form a gate insulating layer 113. Then, an amorphous silicon layer 135 and a metal layer 136 of, for example, Cr, Cu Al, Mo, Ti, Ta, MoW or AlNd are sequentially deposited on the gate insulating layer 113, and a photoresist 137 is formed on the metal layer 136. In addition, an ohmic contact layer may be patterned in a method of implanting impurity ions between the amorphous silicon layer 135 and the metal layer 136.

Figure 15B:
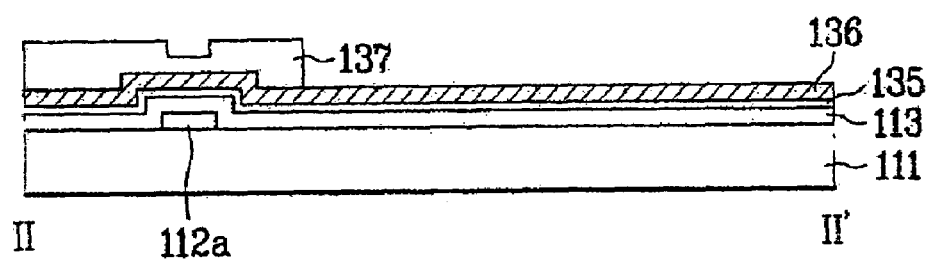

In FIG. 15B, the photoresist 137 is patterned by an exposure and developing process using a half-tone mask. That is, the photoresist 137 remains on a channel region of the thin film transistor, source and drain regions and a data line, and remaining portions of the photoresist 137 are removed. A portion of the photoresist 137 over the channel region of the thin film transistor is thinner than other portions of the photoresist.

Figure 15C:
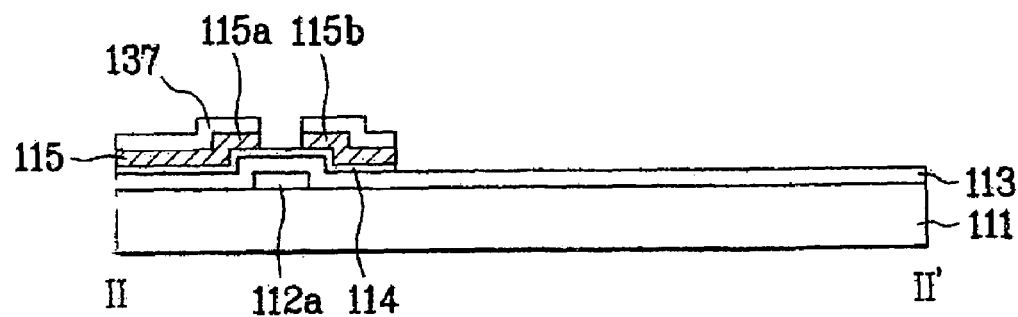

As shown in FIG. 15C, the exposed metal layer 136 and the amorphous silicon layer 135 are selectively removed using the photoresist 137 as a mask, thereby forming the data line 115 and a semiconductor layer 114, the data line 115 is substantially perpendicular to the gate line to define a pixel region. The photoresist 137 corresponding to the channel region of the thin film transistor is removed by ashing. Then, the metal layer 136 corresponding to the channel region of the thin film transistor is selectively removed using the photoresist 137 as a mask, whereby source and drain electrodes 115a and 115b are formed at both sides of the semiconductor layer 114.

Figure 15D:
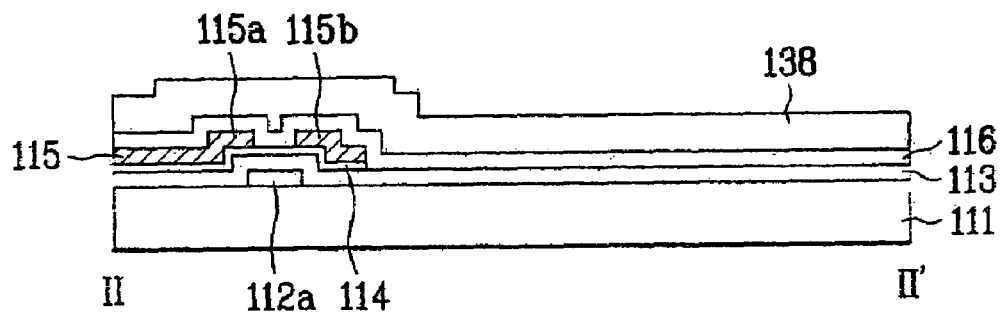
Figure 15E:
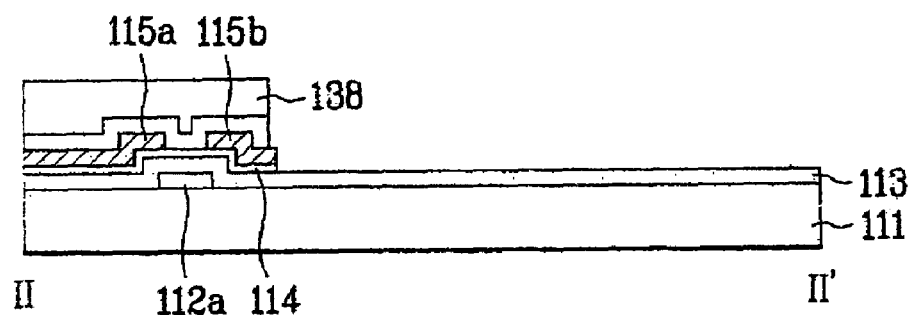

As shown in FIG. 15D, a silicon nitride layer or an organic insulating layer of, for example, BCB is formed on the entire surface of the lower substrate 111 including the data line 115 to form a passivation layer 116. Then, a photoresist 138 is formed on the passivation layer 116. In FIG. 15E, the photoresist 138 is patterned by an exposure and developing process, and the passivation layer 116 is selectively removed using the photoresist 138 as a mask to form a contact hole in the drain electrode 115b. Next, the passivation layer 116 of the pixel region is removed.

Figure 15F:
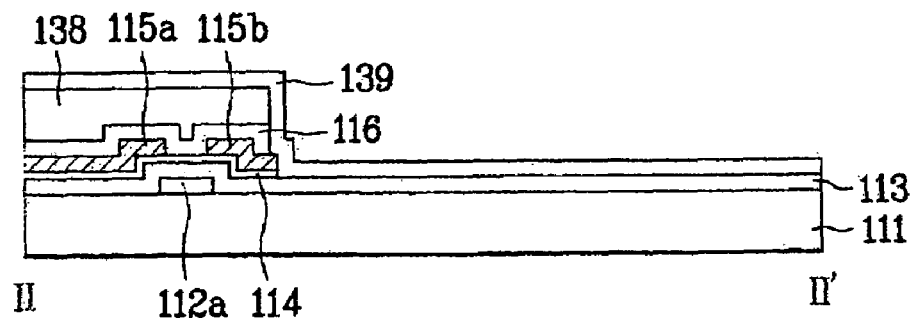
Figure 15G:
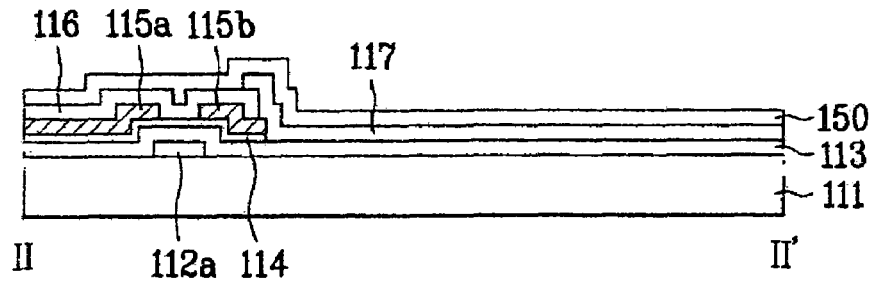

In FIG. 15F, a transparent conductive layer 139 is formed on the entire surface of the lower substrate 111 including the photoresist 138. Then, as shown in FIG. 15G, the photoresist 138 is removed using a lift-off method, and simultaneously, the transparent conductive layer 139 on the photoresist 138 is removed, whereby a pixel electrode 117, connected with the drain electrode 115b, is formed in the pixel region. The pixel electrode 117 is substantially parallel to the data line 115, and formed between the common electrodes. Specifically, the plurality of pixel electrodes 117 may be formed in an alternating pattern with the common electrodes. Instead of the transparent conductive layer 139, a metal layer may be deposited and removed in the lift-off method to form the pixel electrode 117. Thereon, polyimide resin having a great affinity to liquid crystal is printed on the substrate and dried to form as imide, thereby forming a first orientation layer 150.

Figure 15H:
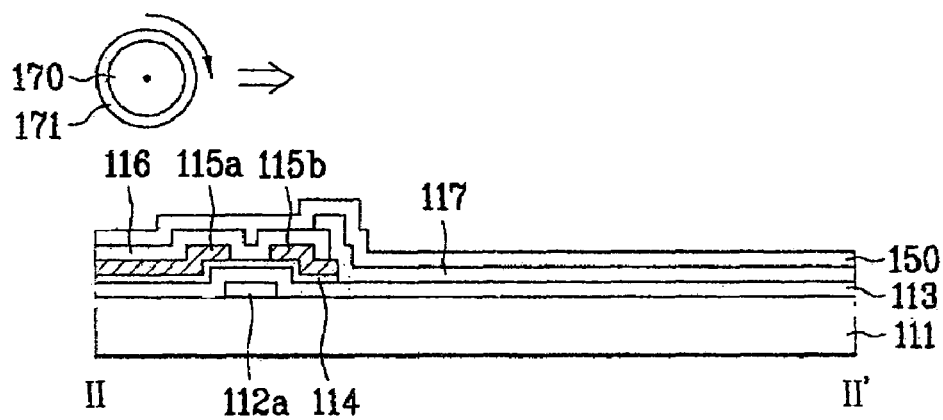
Figure 15I:
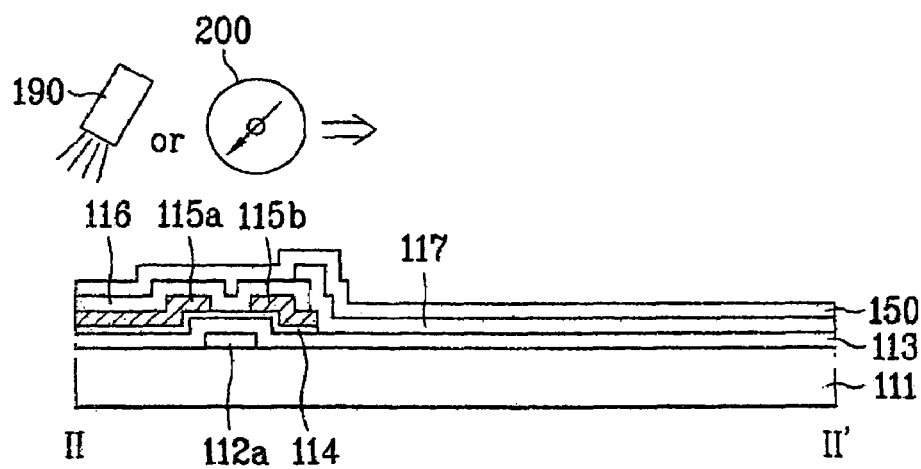

In FIG. 15H, the first orientation layer 150 is rubbed with a cylindrical roll 170, on which a cloth 171 of rayon or nylon is adhered. As shown in FIG. 15I, an ion beam or light is irradiated on the first orientation layer 150 rubbed with the cloth 171, using an ion beam irradiation device 190 or a light irradiation device 200 to align an orientation direction. The ion beam or light may be irradiated on an entire surface of the first orientation layer 150 or irradiated on the first orientation layer 150 after masking the remaining portions of the first orientation layer 150 except a step portion of a contact portion between the pixel electrode and the drain electrode of the thin film transistor. The ion beam or light is irradiated at the same direction as the rubbing direction.

As explained in the first embodiment of the present invention, plasma irradiation may be performed. In the case of the light irradiation, the orientation layer is formed, and the partially polarized light, the linearly polarized light, or the non-polarized light is irradiated under the same condition as that of the first embodiment of the present invention. In this case, the rubbing process may be performed after the ion beam irradiation, the light irradiation or the plasma irradiation. In the third embodiment of the present invention, the ion beam or the light is irradiated under the same condition as that of the first embodiment of the present invention. Accordingly, in the case of the IPS mode LCD device using three masks as described in the third embodiment of the present invention, it is possible to prevent light leakage generated by non-uniformity of the liquid crystal orientation direction due to defective rubbing, and light leakage at the step portion of the contact portion between the pixel electrode and the drain electrode, thereby obtaining high contrast ratio.

The orientation direction alignment process may be additionally applied to various types of LCD devices performing the rubbing process, for example, a TN (Twisted Nematic) mode, an OCB (Optically Controlled Bireflingence) mode, a VA (Vertical Alignment) mode, a COT (color filter on TFT array) mode and TOC (TFT on color filter) mode, as well as the IPS mode, to resolve the problem of defective rubbing. Methods for fabricating a TN mode LCD device, a transflective type LCD device, and the VA mode LCD device will be described as follows.

Figure 16A:
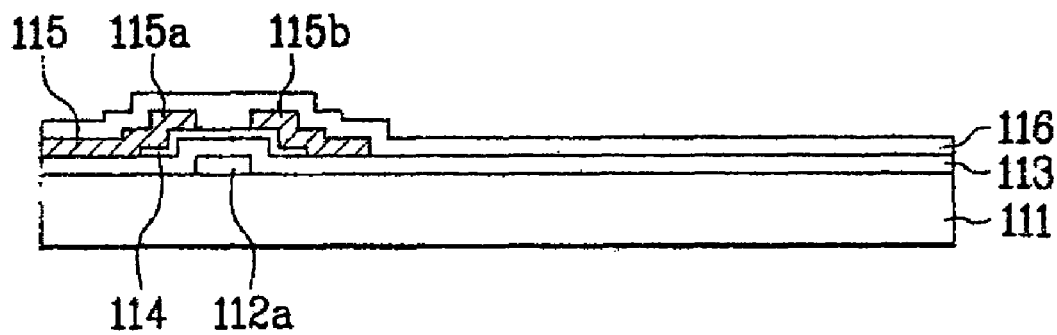
FIG. 16A to FIG. 16D are cross-sectional views illustrating the fabrication process of a TN mode LCD device according to the fourth embodiment of the present invention.

FIG. 16A to FIG. 16D are cross-sectional views illustrating the fabrication process of a TN mode LCD device according to the fourth embodiment of the present invention. As shown in FIG. 16A, a low-resistance metal layer having low specific resistance is formed on a lower substrate 111, and patterned using photolithography to form a gate line (not shown) and a gate electrode 112a of a thin film transistor, the gate electrode 112a is diverged from the gate line. The low-resistance metal layer may be formed of copper (Cu), aluminum (Al), aluminum neodymium (AlNd), molybdenum (Mo), chrome (Cr), titanium (Ti), tantalum (Ta), or molybdenum-tungsten (MoW). Subsequently, an inorganic insulating layer of silicon nitride ($SiN_x$) or silicon oxide ($SiO_x$) is formed on an entire surface of the lower substrate 111 including the gate electrode 112a by PECVD (Plasma Enhanced Chemical Vapor Deposition) to form a gate insulating layer 113. Then, an amorphous silicon layer is formed on the gate insulating layer 113, and selectively removed, forming an island-shaped semiconductor layer 114 on the gate insulating layer 113 above the gate electrode 112a. Additionally, an ohmic contact layer may be patterned in a method of implanting impurity ions to the amorphous silicon layer. Next, a metal layer of Cr, Cu, Al, Mo, Ti, Ta, MoW or AlNd is formed on an entire surface of the gate insulating layer 113, and patterned using photolithography to form a data line 115 and source/drain electrodes 115a/115b at the same time. The data line 115 is formed substantially perpendicular to the gate line to define a pixel region, and the source/drain electrodes 115a/115b are formed at both sides of the semiconductor layer 114. Thereafter, a passivation layer 116 is formed on the entire surface of the lower substrate 111 including the data line 115.

Figure 16B:
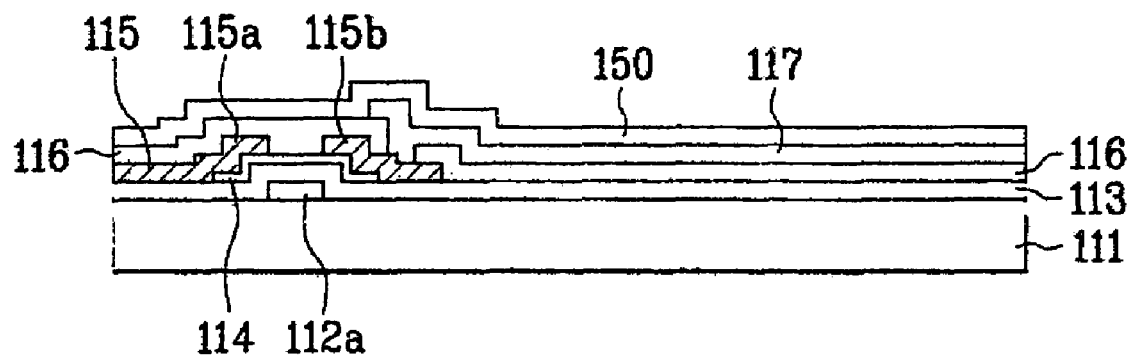

In FIG. 16B, a portion of the passivation layer 116 corresponding to the drain electrode 115b is removed to form a contact hole. Then, a transparent conductive layer is deposited on the entire surface of the lower substrate 111, wherein the transparent conductive layer is electrically connected with the drain electrode 115b through the contact hole. Also, the transparent conductive layer is selectively removed and the remaining portion on the pixel region forms a pixel electrode 117. Thereafter, polyimide resin having thermal-resistance and great affinity to liquid crystal is printed on the entire surface of the lower substrate 111 including the pixel electrode 117. Then, the printed polyimide resin is dried and formed as imide, forming a first orientation layer 150.

Figure 16C:
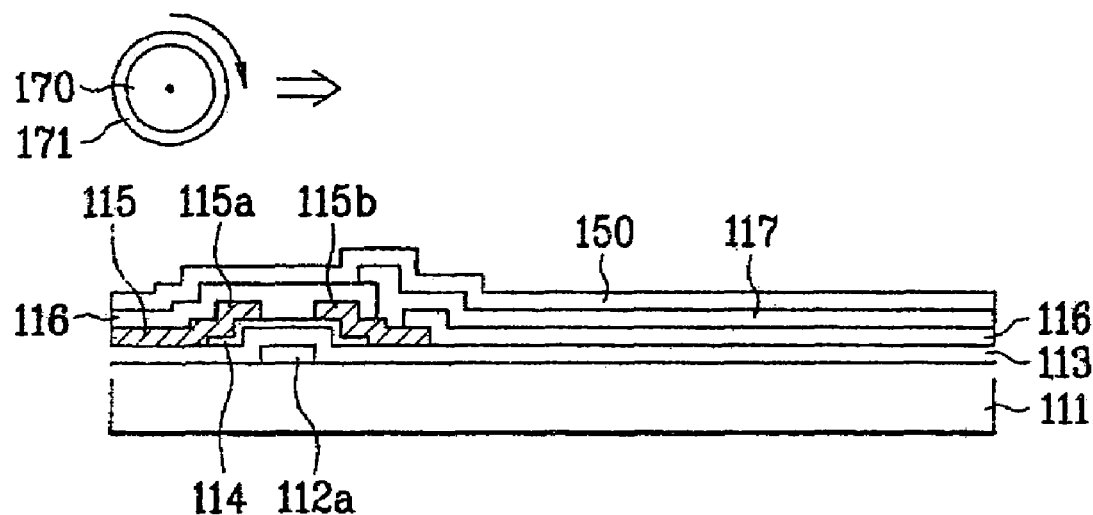
Figure 16D:
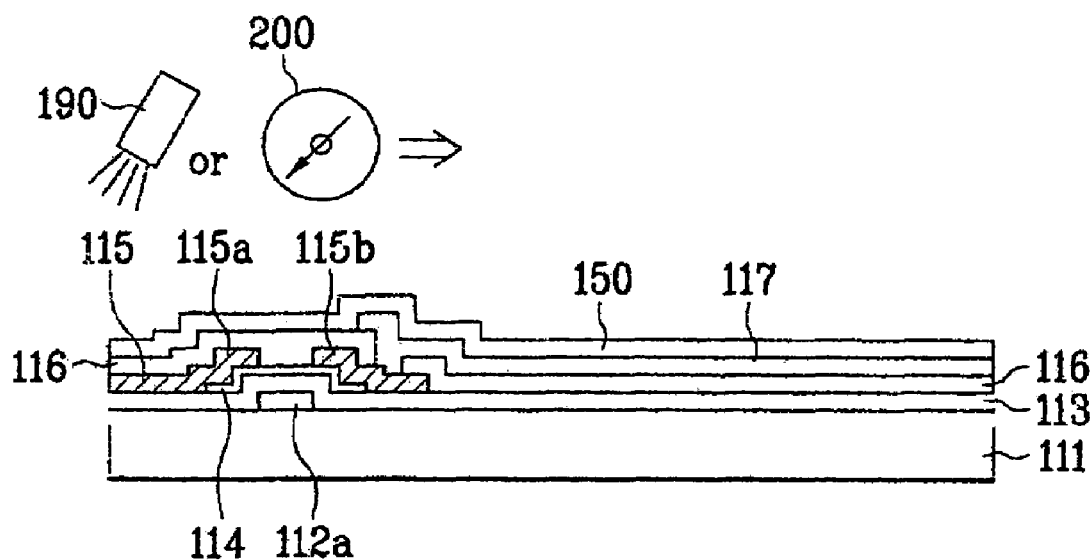

As shown in FIG. 16C, the first orientation layer 150 is rubbed with a cylindrical roll 170, on which a cloth 171 of rayon or nylon is adhered to form a first polarizing direction in the first orientation layer 150. In FIG. 16D, the orientation direction of the first orientation layer 150 is aligned using an ion beam irradiation device 190 or a light irradiation device 200. The ion beam may be irradiated on an entire surface of the first orientation layer 150, or irradiated to the first orientation layer 150 after masking remaining portions of the first orientation layer 150 except a step portion of a crossing portion between the gate and data lines, and step coverage of the thin film transistor. At this time, the ion beam or light is irradiated at the same direction as the rubbing direction.

As explained in the first embodiment of the present invention, plasma irradiation may be performed. In case of the light irradiation, the orientation layer is deposited, and the partially polarized light, the linearly polarized light, or the non-polarized light is irradiated under the same condition as that of the first embodiment of the present invention. In this case, the rubbing process may be performed after the ion beam irradiation, the light irradiation or the plasma irradiation. In the fourth embodiment of the present invention, the ion beam or the light is irradiated under the same condition as that of the first embodiment of the present invention. Thereafter, the same process as that of the first embodiment of the present invention is implemented. Accordingly, in the case of the TN mode LCD device, it is possible to prevent light leakage generated by non-uniformity of liquid crystal orientation due to the defective rubbing, and light leakage at a step portion of a crossing portion between the gate and data lines, and at a step coverage of the thin film transistor to obtain a high contrast ratio.

Also, although not shown, it is possible to apply the fabrication process of the fourth embodiment of the present invention to a TOC mode after the TN mode process by forming a color filter layer on the substrate, and the COT mode by forming the pixel electrode after forming a color filter layer on the passivation layer. In this case, it is possible to additionally form an overcoat layer on the color filter layer in the above TOC mode and COT mode.

FIG. 17A to FIG. 17E are cross-sectional views illustrating the fabrication process of a transflective type LCD device according to the fifth embodiment of the present invention. In the transflective type LCD device according to the fifth embodiment of the present invention, a pixel region is defined as a transmitting part and a reflective part.

Figure 17A:
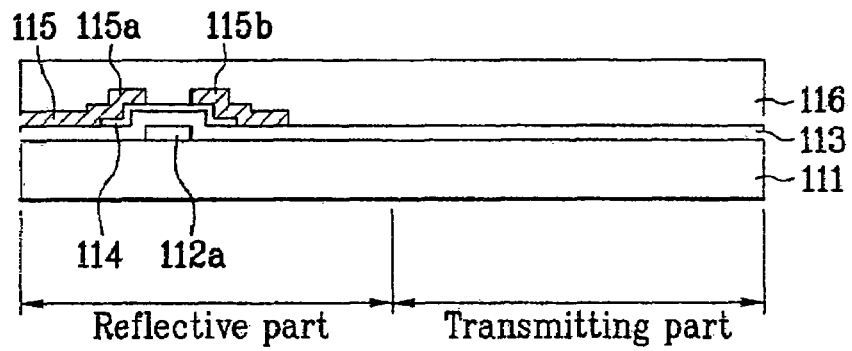
FIG. 17A to FIG. 17E are cross-sectional views illustrating the fabrication process of a transflective type LCD device according to the fifth embodiment of the present invention.

As shown in FIG. 17A, a low-resistance metal layer having low specific resistance is formed on a substrate 111, and patterned using photolithography to form a gate line (not shown) and a gate electrode 112a of a thin film transistor, the gate electrode 112a being diverged from the gate line. The low-resistance metal layer is formed of copper (Cu), aluminum (Al), aluminum neodymium (AlNd), molybdenum (Mo), chrome (Cr), titanium (Ti), tantalum (Ta) or molybdenum-tungsten (MoW). Subsequently, an inorganic insulating layer of silicon nitride ($SiN_x$) or silicon oxide ($SiO_x$) is formed on an entire surface of the lower substrate 111 including the gate electrode 112a by PECVD (Plasma Enhanced Chemical Vapor Deposition), thereby forming a gate insulating layer 113. Then, an amorphous silicon layer is formed on the gate insulating layer 113, and selectively removed to form an island-shaped semiconductor layer 114 on the gate insulating layer 113 above the gate electrode 112a. Additionally, an ohmic contact layer may be patterned in a method of implanting impurity ions into the amorphous silicon layer. Next, a metal layer of Cr, Cu, Al, Mo, Ti, Ta, MoW or AlNd is formed on an entire surface of the gate insulating layer 113 and patterned using photolithography to form a data line 115 and source/drain electrodes 115a/115b at the same time. The data line 115 is substantially perpendicular to the gate line to define a pixel region and the source/drain electrodes 115a/115b are formed at both sides of the semiconductor layer 114. Thereafter, a passivation layer 116 is formed on the entire surface of the substrate including the data line 115.

Figure 17B:
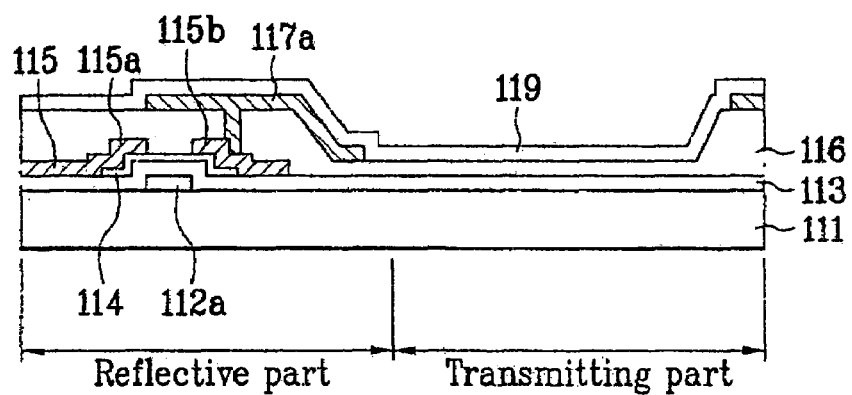

In FIG. 17B, a portion of the passivation layer 116 corresponding to the drain electrode 115b is removed to form a contact hole. Simultaneously, the passivation layer 116 of the transmitting part is selectively removed. Then, a metal layer is connected with the drain electrode 115b through the contact hole and is patterned to remain on the reflective part of the pixel region, whereby a reflective electrode 117a is formed in the reflective part of the pixel region. Also, an insulating layer 119 is formed on the entire surface of the substrate.

Figure 17C:
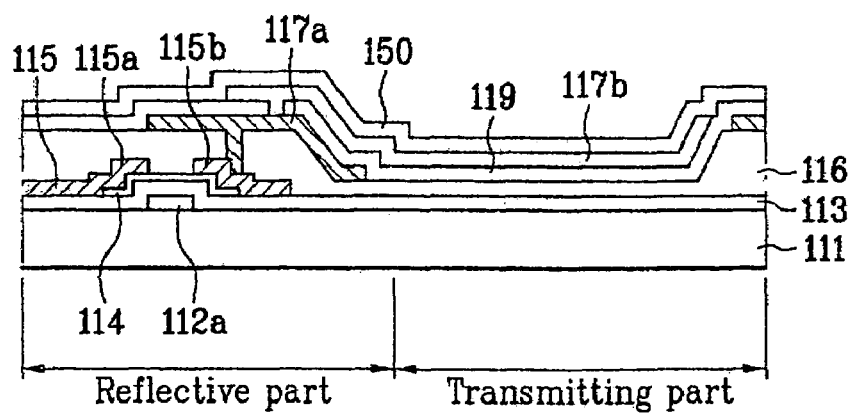

As shown in FIG. 17C, a portion of the insulating layer 119 is removed to form a contact hole to the reflective electrode 117a. Then, a transparent conductive layer is formed on the insulating layer 119, wherein the transparent conductive layer is electrically connected with the reflective electrode 117a through the contact hole. After that, the transparent conductive layer is selectively removed to remain on the transmitting part of the pixel region, thereby forming a transparent electrode 117b. Thereafter, polyimide resin having thermal-resistance and affinity to liquid crystal is printed on the substrate, and dried to be formed as polyimide, thereby forming a first orientation layer 150.

Figure 17D:
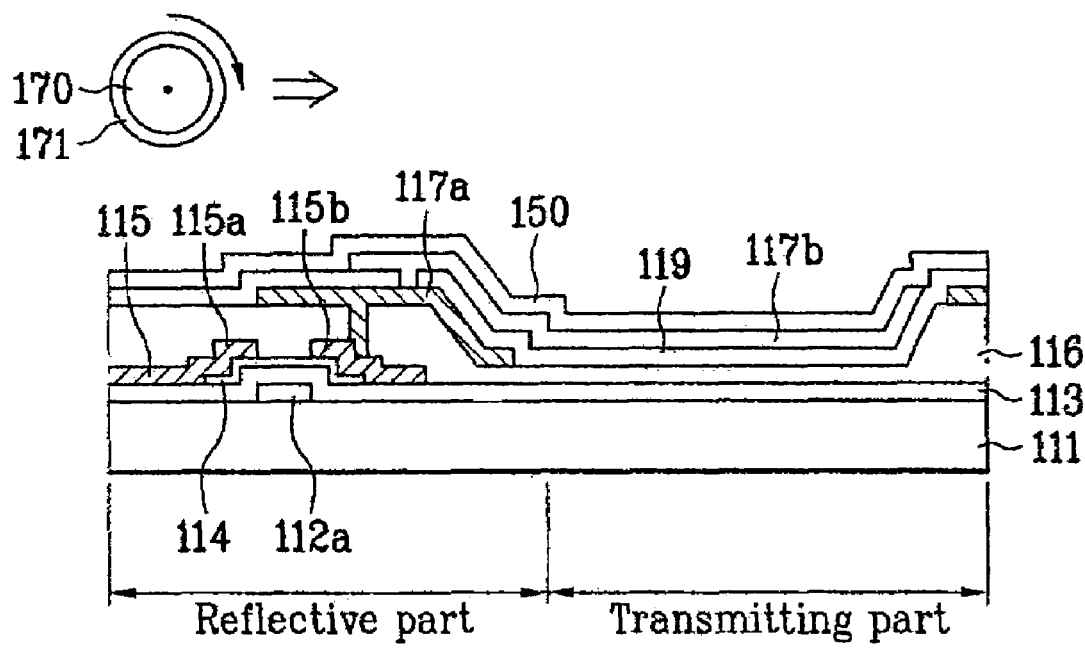
Figure 17E:
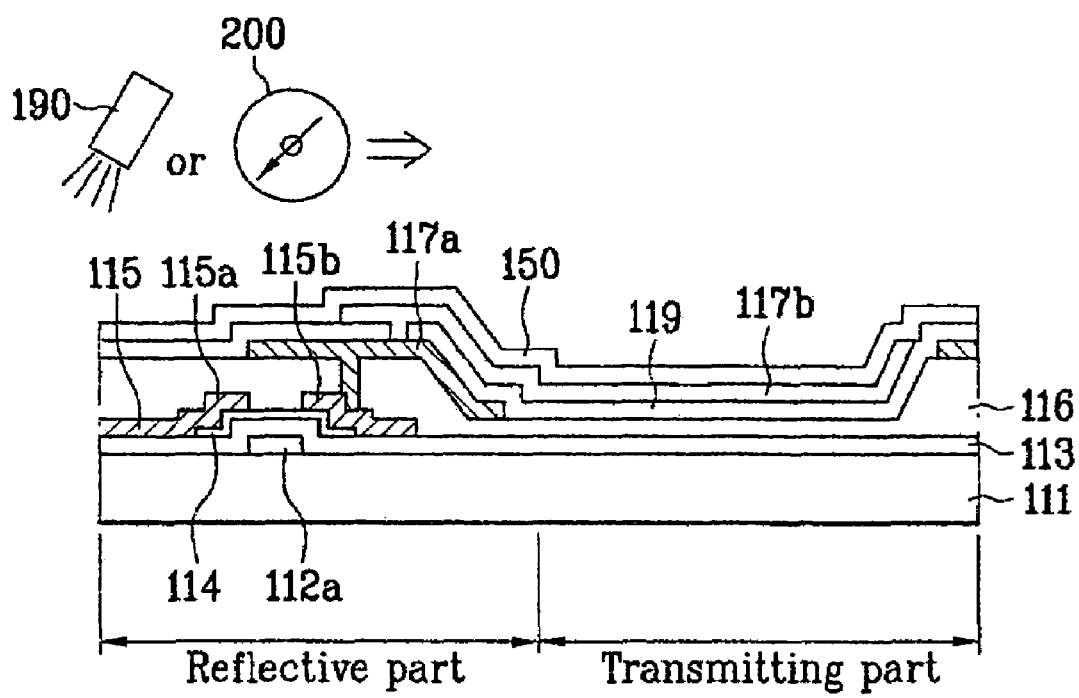

As shown in FIG. 17D, the first orientation layer 150 is rubbed with a cylindrical roll 170, on which a cloth 171 of rayon or nylon is adhered to form an orientation direction at a first polarizing direction. In FIG. 17E, the first orientation layer 150 rubbed with the cloth is aligned using an ion beam irradiation device 190 or a light irradiation device 200. The ion beam may be irradiated on an entire surface of the first orientation layer 150 or irradiated on the first orientation layer 150 after masking remaining portions of the first orientation layer 150 except a step portion between the reflective part and the transmitting part. The ion beam or light is irradiated at the same direction as the rubbing direction.

As explained in the first embodiment of the present invention, plasma irradiation may be performed. In a case of the light irradiation, the orientation layer is deposited, and the partially polarized light, the linearly polarized light, or the non-polarized light is irradiated under the same condition as that of the first embodiment of the present invention. In this case, the rubbing process may be performed after the ion beam irradiation, the light irradiation or the plasma irradiation. In the fifth embodiment of the present invention, the ion beam or the light is irradiated under the same condition as that of the first embodiment of the present invention. Thereafter, the same following process as that of the first embodiment of the present invention is initiated. Accordingly, in the case of the transflective mode LCD device, it is possible to prevent light leakage generated by non-uniformity of liquid crystal orientation due to defective rubbing and light leakage at the step portion between the reflective part and the transmitting part to obtain high contrast ratio.

FIG. 18A to FIG. 18D are cross-sectional views illustrating the fabrication process of a VA mode LCD device according to the sixth embodiment of the present invention.

Figure 18A:
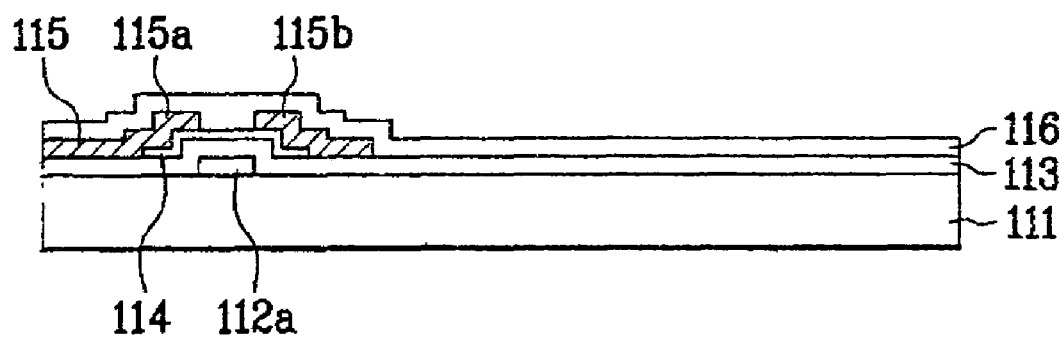
FIG. 18A to FIG. 18D are cross-sectional views illustrating the fabrication process of a VA mode LCD device according to the sixth embodiment of the present invention.

As shown in FIG. 18A, a low-resistance metal layer having low specific resistance is formed on a substrate 111 and patterned using photolithography to form a gate line (not shown) and a gate electrode 112a of a thin film transistor. The gate electrode 112a is diverged from the gate line. The low-resistance metal layer may be formed of copper (Cu), aluminum (Al), aluminum neodymium (AlNd), molybdenum (Mo), chrome (Cr), titanium (Ti), tantalum (Ta) or molybdenum-tungsten (MoW). Subsequently, an inorganic insulating layer of silicon nitride ($SiN_x$) or silicon oxide ($SiO_x$) is formed on an entire surface of the substrate 111 including the gate electrode 112a by PECVD (Plasma Enhanced Chemical Vapor Deposition) to form a gate insulating layer 113. An amorphous silicon layer is formed on the gate insulating layer 113, and selectively removed to form an island-shaped semiconductor layer 114 on the gate insulating layer 113 above the gate electrode 112a. Additionally, an ohmic contact layer may be patterned in a method of implanting impurity ions into the amorphous silicon layer. Then, a metal layer of Cr, Cu, Al, Mo, Ti, Ta, MoW or AlNd is formed on an entire surface of the gate insulating layer 113, and patterned using photolithography to form a data line 115 and source/drain electrodes 115a/115b at the same time. The data line 115 is substantially perpendicular to the gate line to define a pixel region, and the source/drain electrodes 115a/115b are formed at both sides of the semiconductor layer 114. Thereafter, a passivation layer 116 is formed on the entire surface of the substrate including the data line 115.

Figure 18B:
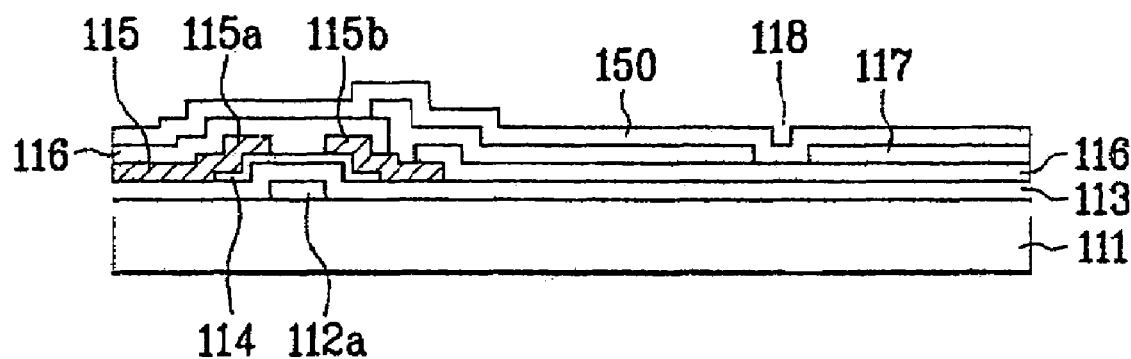

In FIG. 18B, a portion of the passivation layer 116 corresponding to the drain electrode 115b is removed, to form a contact hole. Also, a transparent conductive layer is formed on the entire surface of the substrate, wherein the transparent conductive layer is electrically connected to the drain electrode 115b through the contact hole. Then, the transparent conductive layer is selectively removed to remain on the pixel region to form a pixel electrode 117. Simultaneously, a slit 118 is formed in a method of removing a predetermined portion of the pixel electrode. Also, a dielectric frame of an organic insulating material may be formed on the same layer as the passivation layer 116. Alternatively, the dielectric frame may be formed on an opposing substrate on a common electrode or the slit may be formed in a predetermined portion of a common electrode on the opposing substrate. Thereafter, polyimide resin having thermal-resistance and great affinity to liquid crystal is formed on the entire surface of the substrate including the pixel electrode 117, and dried to be formed as imide to form a first orientation layer 150.

Figure 18C:
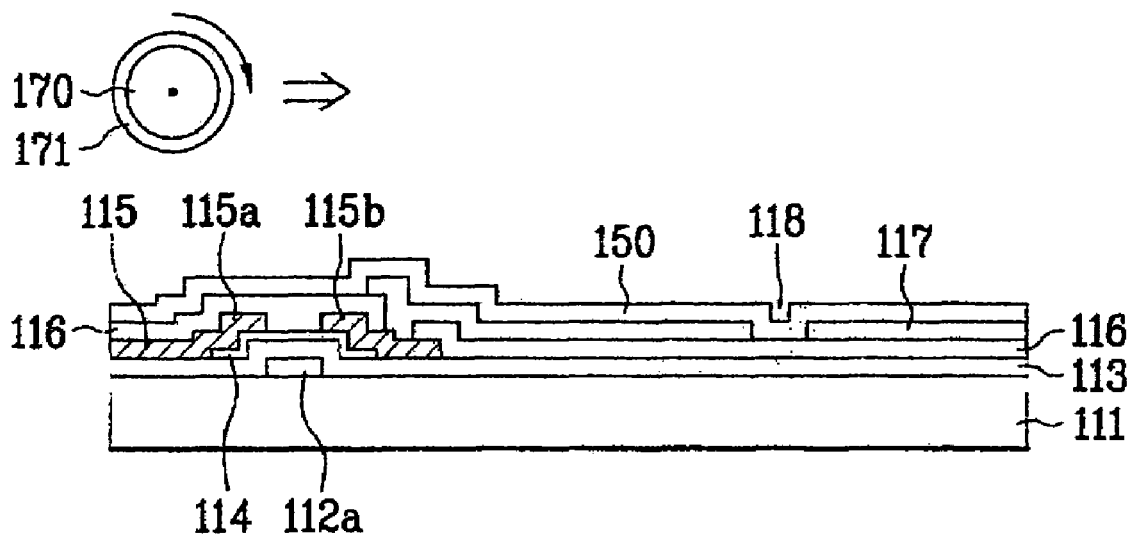
Figure 18D:
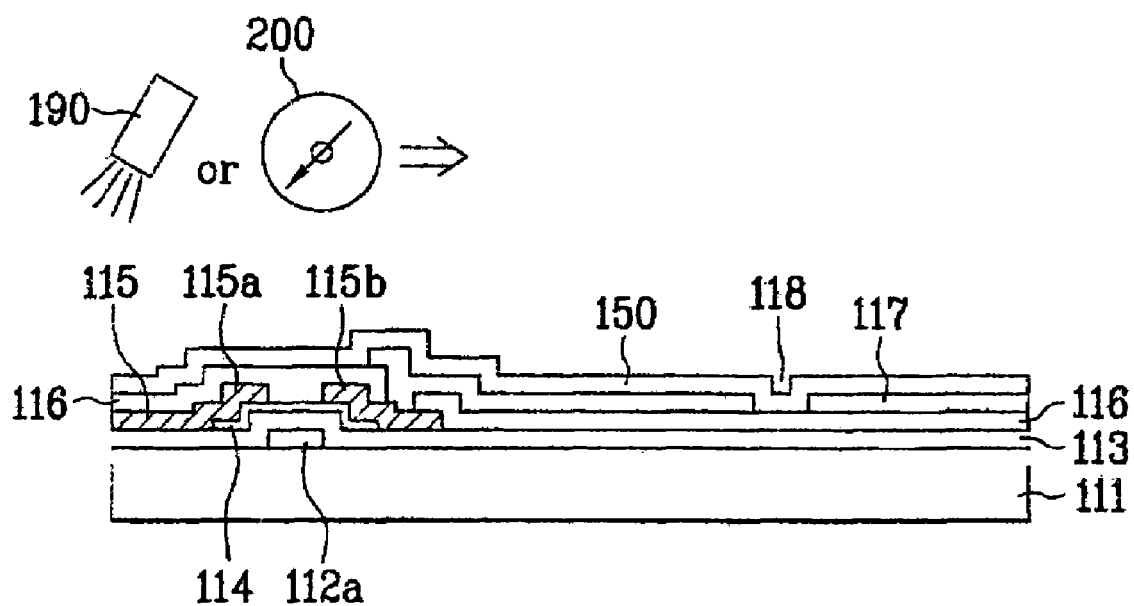

In FIG. 18C, the first orientation layer 150 is rubbed with a cylindrical roll 170, on which a cloth 171 of rayon or nylon is adhered. The first orientation layer 150 is rubbed to have a first polarizing direction. As shown in FIG. 18D, an ion beam or light is irradiated on the first orientation layer 150 rubbed with the cloth 171 using an ion beam irradiation device 190 or a light irradiation device 200, to align an orientation direction. At this time, an ion beam or light may be irradiated on an entire surface of the first orientation layer 150, or irradiated on the first orientation layer 150 after masking the remaining portions of the first orientation layer 150 except a step portion of a crossing portion between the gate and data lines, a step portion of the thin film transistor, and a step portion of the slit 118. The ion beam or light is irradiated at the same direction as the rubbing direction.

As explained in the first embodiment of the present invention, plasma irradiation may be performed. In a case of the light irradiation, the orientation layer is deposited, and the partially polarized light, the linearly polarized light, or the non-polarized light is irradiated under the same condition as that of the first embodiment of the present invention. In this case, the rubbing process may be performed after the ion beam irradiation, the light irradiation or the plasma irradiation. In the sixth embodiment of the present invention, the ion beam or the light is irradiated under the same condition as that of the first embodiment of the present invention. The remaining processes are the same as that of the first embodiment of the present invention. However, a projection may be formed on the common electrode.

Accordingly, in case of the VA mode LCD device according to the present invention, it is possible to prevent light leakage generated by non-uniformity of liquid crystal orientation due to defective rubbing, and light leakage at the step portion of the crossing portion between the gate and data lines, the step portion of the thin film transistor and the slit to obtain high contrast ratio.

Figure 19:
FIG. 19 is a photograph illustrating light leakage in an LCD device according to the present invention.

FIG. 19 is a photograph illustrating light leakage on an LCD device according to the present invention. In FIG. 19, the light leakage is not generated in the LCD device fabricated by performing the additional orientation direction alignment process.

As mentioned above, the LCD device according to the present invention and the method for fabricating the same have the following advantages.

In the method for fabricating the LCD device according to the present invention, the orientation direction alignment process is performed with the rubbing process. Therefore, whereby it is possible to obtain the uniform orientation direction on the entire substrate by resolving the problem of defective rubbing generated by non-uniformity of the rubbing cloth. Also, the liquid crystal is uniformly controlled by the uniform orientation direction, thereby preventing the light leakage generated by the defective rubbing.

Additionally, it is possible to obtain the uniform orientation direction at the step portion using an ion beam irradiation, light irradiation or plasma irradiation to prevent the defective rubbing generated when the roll is not in contact with the step portion during the rubbing process. Also, liquid crystal molecules are controlled by performing the orientation direction alignment process to the step portion of the orientation layer, thereby preventing the light leakage at the step portion. By preventing the light leakage, it is possible to lower a black level and obtain a higher contrast ratio of the LCD device, thereby improving quality for displaying images.

When the defective orientation is generated at the step portion during the rubbing process, a step portion generated in a portion of a column spacer. If the portion of the defective orientation is not covered with a black matrix layer, light leaks at the portion of the defective orientation. However, even though the step portion is generated in the portion of the column spacer, it is possible to prevent the defective rubbing and to prevent the light leakage at the step portion which is not covered with the black matrix layer because the embodiments of the present invention perform the rubbing process and the orientation direction alignment process together.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for fabricating an LCD device comprising:
preparing first and second substrates;
forming a thin film transistor on the first substrate;
forming a first orientation layer on the first substrate including the thin film transistor;
performing rubbing and orientation direction alignment processes on the first orientation layer to provide a uniform alignment direction; and
forming a liquid crystal layer between the first and second substrates.

2. The method of claim 1, wherein the orientation direction alignment process is performed prior to the rubbing process.

3. The method of claim 1, wherein the orientation direction alignment process is performed after the rubbing process.

4. The method of claim 1, wherein the orientation direction alignment process is performed on an entire surface of the first orientation layer.

5. The method of claim 1, wherein the orientation direction alignment process is performed using a mask on remaining portions of the first orientation layer except a step portion.

6. The method of claim 1, wherein the alignment direction of an entire surface of the first orientation layer is substantially the same as the orientation direction alignment process.

7. The method of claim 1, wherein a pretilt angle of an entire surface of the first orientation layer is substantially the same as the orientation direction alignment process.

8. The method of claim 1, wherein the first orientation layer is formed of one of polyimide, polyamic acid, polyvinylcinnamate, polyazobenzene, polyethyleneimine, polyvinyl alcohol, polyamide, polyethylene, polystylene, polyphenylenephthalamide, polyester, polyurethane, and polymethyl methacrylate.

9. The method of claim 1, wherein the orientation direction alignment process is an irradiated one of an ion beam, light and plasma on the first orientation layer.

10. The method of claim 9, wherein the light includes one of a partially polarized light, a linearly polarized light and a non-polarized light.

11. The method of claim 9, wherein a wavelength of the light is between about 200 nm and about 450 nm.

12. The method of claim 9, wherein the light is irradiated substantially perpendicular with respect to the first substrate.

13. The method of claim 9, wherein the light is irradiated substantially obliquely with respect to the first substrate.

14. The method of claim 9, wherein the light polarizes substantially perpendicular to a rubbing direction of the rubbing process.

15. The method of claim 1, wherein the rubbing process and the orientation direction alignment process are performed substantially simultaneously to the first orientation layer.

16. The method of claim 1, further comprising:
forming a second orientation layer on the second substrate; and
performing the rubbing process and the orientation direction alignment process on the second orientation layer.

17. The method of claim 16, wherein alignment directions of the first orientation layer and the second orientation layer are formed by substantially the same process.

18. The method of claim 16, wherein pretilt angles of the first orientation layer and the second orientation layer are substantially the same.

19. The method of claim 1, wherein forming the thin film transistor includes:
forming a gate line, a gate electrode, a common line, and a plurality of common electrodes on the first substrate;
forming a gate insulating layer on the first substrate;
forming a semiconductor layer on the gate insulating layer;
forming a data line and source/drain electrodes on the first substrate;
forming a passivation layer on the first substrate; and
forming a plurality of pixel electrodes on the passivation layer.

20. The method of claim 1, wherein forming the thin film transistor includes:
forming a gate line, a gate electrode, a common line, and a plurality of common electrodes on the first substrate;
forming a gate insulating layer on the first substrate;
forming a semiconductor layer on the gate insulating layer;
forming a data line and source/drain electrodes and a plurality of pixel electrodes on the first substrate; and
forming a passivation layer on the first substrate.

21. The method of claim 1, wherein forming the thin film transistor includes:
forming a gate line and a gate electrode on the first substrate;
forming a gate insulating layer on the first substrate;
forming a semiconductor layer on the gate insulating layer;
forming a data line and source/drain electrodes on the first substrate;
forming a passivation layer on the first substrate; and
forming a plurality of pixel electrodes and a plurality of common electrodes on the passivation layer.

22. The method of claim 21, wherein the pixel electrode and the common electrode are formed of a transparent conductive material.

23. The method of claim 22, wherein the transparent conductive material includes one of Indium Tin Oxide and Indium Zinc Oxide.

24. The method of claim 1, wherein forming the thin film transistor includes:
forming a gate line, a gate electrode, a common line, and a plurality of common electrodes on the first substrate;
sequentially forming a gate insulating layer, a semiconductor layer and a metal layer on the first substrate;
forming a data line and source/drain electrodes by selectively removing the metal layer and the semiconductor layer using a half-tone mask;
sequentially forming a passivation layer and a photoresist on the first substrate;
removing the passivation layer on the drain electrode using an exposing and developing process; and
forming a plurality of pixel electrodes by forming a conductive layer on the first substrate and removing the photoresist and the conductive layer using a lift-off method.

25. The method of claim 24, wherein the conductive layer is formed of one of a transparent conductive layer and a metal layer.

26. The method of claim 1, wherein forming the thin film transistor includes:
forming a gate line and a gate electrode on the first substrate;
forming a gate insulating layer and a semiconductor layer on the first substrate;
forming a data line and source/drain electrodes on the first substrate;
forming a passivation layer on the first substrate; and
forming a pixel electrode on the passivation layer, the pixel electrode connected with the drain electrode.

27. The method of claim 26, further comprising forming a slit in the pixel electrode.

28. The method of claim 26, further comprising forming a common electrode on the second substrate; and forming a slit in the common electrode.

29. The method of claim 26, further comprising forming a common electrode on the second substrate; and forming a dielectric frame on the common electrode.

30. The method of claim 26, further comprising forming a dielectric frame on at least one of first and second substrates.

31. The method of claim 30, wherein the dielectric frame is formed as the passivation layer.

32. The method of claim 26, further comprising forming a color filter layer on the first substrate.

33. The method of claim 26, further comprising forming a color filter layer on the passivation layer.

34. The method of claim 1, wherein forming the thin film transistor includes:
forming a gate line and a gate electrode on the first substrate;
forming a gate insulating layer on the first substrate;
forming a semiconductor layer on the gate insulating layer;
forming a data line and source/drain electrodes on the first substrate;
forming a passivation layer on the first substrate;
forming a reflective electrode on the passivation layer in a reflective part of a pixel region, the reflective electrode being connected to the drain electrode; and
forming a transparent electrode in a transmitting part of the pixel region, the transparent electrode being connected with the reflective electrode.

35. A method for fabricating an LCD device comprising:
preparing first and second substrates;
forming a thin film transistor on the first substrate;
forming a first orientation layer on the first substrate;
performing rubbing and orientation direction alignment processes on the first orientation layer to provide a uniform alignment direction;
forming a second orientation layer on the second substrate;
performing a rubbing process on the second orientation layer; and
forming a liquid crystal layer between the first and second substrates.

36. The method of claim 35, wherein the orientation direction alignment process is performed using a mask on remaining portions of the first orientation layer except a step portion.

37. The method of claim 35, wherein an alignment direction of an entire surface of the first orientation layer is substantially the same as the orientation direction alignment process.

38. The method of claim 35, wherein a pretilt angle of an entire surface of the first orientation layer is substantially the same as the orientation direction alignment process.

39. The method of claim 35, wherein the first and second orientation layers are formed of one of polyimide, polyamic acid, polyvinylcinnamate, polyazobenzene, polyethyleneimine, polyvinyl alcohol, polyamide, polyethylene, polystylene, polyphenylenephthalamide, polyester, polyurethane, and polymethyl methacrylate.

40. The method of claim 35, wherein the orientation direction alignment process is an irradiated one of an ion beam, a light and a plasma on the first orientation layer.

41. The method of claim 40, wherein the light includes one of a partially polarized light, a linearly polarized light and a non-polarized light.

42. The method of claim 40, wherein the light polarizes substantially perpendicular to a rubbing direction of the rubbing process.

* * * * *